US008160249B2

(12) United States Patent
Moskowitz et al.

(10) Patent No.: US 8,160,249 B2
(45) Date of Patent: *Apr. 17, 2012

(54) UTILIZING DATA REDUCTION IN STEGANOGRAPHIC AND CRYPTOGRAPHIC SYSTEM

(75) Inventors: Scott A. Moskowitz, Sunny Isles Beach, FL (US); Mike W. Berry, Seattle, WA (US)

(73) Assignee: Blue Spike, Inc., Sunny Isles Beach, FL (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/655,036

(22) Filed: Dec. 22, 2009

(65) Prior Publication Data

US 2010/0153734 A1  Jun. 17, 2010

Related U.S. Application Data

(60) Continuation of application No. 11/519,467, filed on Sep. 12, 2006, now Pat. No. 7,664,264, which is a division of application No. 09/594,719, filed on Jun. 16, 2000, now Pat. No. 7,123,718, which is a continuation-in-part of application No. PCT/US00/06522, filed on Mar. 14, 2000.

(60) Provisional application No. 60/125,990, filed on Mar. 24, 1999.

(51) Int. Cl.
*H04N 7/167* (2011.01)
(52) U.S. Cl. ...................................... 380/205
(58) Field of Classification Search .................. None
See application file for complete search history.

(56) References Cited

U.S. PATENT DOCUMENTS 3,947,825 A 3/1976 Cassada
3,984,624 A 10/1976 Waggener
(Continued)

FOREIGN PATENT DOCUMENTS

EP 0372601 6/1990
(Continued)

OTHER PUBLICATIONS

Schneier, Bruce, Applied Cryptography, 2nd Ed., John Wiley & Sons, pp. 9-10, 1996.
(Continued)

*Primary Examiner* — Brandon Hoffman
(74) *Attorney, Agent, or Firm* — Neifeld IP Law, PC

(57) ABSTRACT

The present invention relates to methods for protecting a data signal using the following techniques: applying a data reduction technique to reduce the data signal into a reduced data signal; subtracting the reduced data signal from the data signal to produce a remainder signal; embedding a first watermark into the reduced data signal to produce a watermarked, reduced data signal; and adding the watermarked, reduced data signal to the remainder signal to produce an output signal. A second watermark may be embedded into the remainder signal before the final addition step. Further, cryptographic techniques may be used to encrypt the reduced data signals and to encrypt the remainder signals before the final addition step. The present invention also relates to a system for securing a data signal including: computer devices for applying a data reduction technique to reduce the data signal into a reduced data signal; means to subtract the reduced data signal from the data signal to produce a remainder signal; means to apply a first cryptographic technique to encrypt the reduced data signal to produce an encrypted, reduced data signal; means to apply a second cryptographic technique to encrypt the remainder signal to produce an encrypted remainder signal; and means to add the encrypted, reduced data signal to the encrypted remainder signal to produce an output signal.

34 Claims, 5 Drawing Sheets

U.S. PATENT DOCUMENTS

| | | |
|---|---|---|
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Jones et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalv et al. |
| 5,418,713 A | 5/1995 | Allen |
| 5,428,606 A | 6/1995 | Moskowitz |
| 5,450,490 A | 9/1995 | Jensen et al. |
| 5,469,536 A | 11/1995 | Blank |
| 5,471,533 A | 11/1995 | Wang et al. |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |
| 5,506,795 A | 4/1996 | Yamakawa |
| 5,513,126 A | 4/1996 | Harkins et al. |
| 5,513,261 A | 4/1996 | Maher |
| 5,530,739 A | 6/1996 | Okada |
| 5,530,751 A | 6/1996 | Morris |
| 5,530,759 A | 6/1996 | Braudaway et al. |
| 5,539,735 A | 7/1996 | Moskowitz |
| 5,548,579 A | 8/1996 | Lebrun et al. |
| 5,568,570 A | 10/1996 | Rabbani |
| 5,579,124 A | 11/1996 | Aijala et al. |
| 5,581,703 A | 12/1996 | Baugher et al. |
| 5,583,488 A | 12/1996 | Sala et al. |
| 5,598,470 A | 1/1997 | Cooper et al. |
| 5,606,609 A | 2/1997 | Houser et al. |
| 5,613,004 A | 3/1997 | Cooperman et al. |
| 5,617,119 A | 4/1997 | Briggs et al. |
| 5,625,690 A | 4/1997 | Michel et al. |
| 5,629,980 A | 5/1997 | Stefik et al. |
| 5,633,932 A | 5/1997 | Davis et al. |
| 5,634,040 A | 5/1997 | Her et al. |
| 5,636,276 A | 6/1997 | Brugger |
| 5,636,292 A | 6/1997 | Rhoads |
| 5,640,569 A | 6/1997 | Miller et al. |
| 5,646,997 A | 7/1997 | Barton |
| 5,657,461 A | 8/1997 | Harkins et al. |
| 5,659,726 A | 8/1997 | Sandford, II et al. |
| 5,664,018 A | 9/1997 | Leighton |
| 5,673,316 A | 9/1997 | Auerbach et al. |
| 5,677,952 A | 10/1997 | Blakely et al. |
| 5,680,462 A | 10/1997 | Miller et al. |
| 5,687,236 A | 11/1997 | Moskowitz et al. |
| 5,689,587 A | 11/1997 | Bender et al. |
| 5,696,828 A | 12/1997 | Koopman, Jr. |
| 5,719,937 A | 2/1998 | Warren et al. |
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,748,783 A | 5/1998 | Rhoads |
| 5,751,811 A | 5/1998 | Magnotti et al. |
| 5,754,697 A | 5/1998 | Fu et al. |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,790,677 A | 8/1998 | Fox et al. |
| 5,799,083 A | 8/1998 | Brothers et al. |
| 5,809,139 A | 9/1998 | Girod et al. |
| 5,809,160 A | 9/1998 | Powell et al. |
| 5,818,818 A | 10/1998 | Soumiya |
| 5,822,432 A | 10/1998 | Moskowitz et al. |
| 5,828,325 A | 10/1998 | Wolosewicz et al. |
| 5,832,119 A | 11/1998 | Rhoads |
| 5,842,213 A | 11/1998 | Odom |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,870,474 A | 2/1999 | Wasilewski et al. |
| 5,884,033 A | 3/1999 | Duvall et al. |
| 5,889,868 A | 3/1999 | Moskowitz et al. |
| 5,893,067 A | 4/1999 | Bender et al. |
| 5,894,521 A | 4/1999 | Conley |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,029,126 A | 2/2000 | Malvar |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |

| | | |
|---|---|---|
| 6,131,162 A | 10/2000 | Yoshiura et al. |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florenio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,684 B1 | 5/2001 | Stefik et al. |
| 6,240,121 B1 | 5/2001 | Senoh |
| 6,263,313 B1 | 7/2001 | Milstad et al. |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,363,483 B1 | 3/2002 | Keshav |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,538 B1 | 5/2002 | Gruse et al. |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,484,264 B1 | 11/2002 | Colvin |
| 6,493,457 B1 | 12/2002 | Quackenbush |
| 6,502,195 B1 | 12/2002 | Colvin |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,557,103 B1 | 4/2003 | Boncelet, Jr. et al. |
| 6,584,125 B1 | 6/2003 | Katto |
| 6,587,837 B1 | 7/2003 | Spagna et al. |
| 6,590,996 B1 | 7/2003 | Reed |
| 6,598,162 B1 | 7/2003 | Moskowitz |
| 6,606,393 B1 | 8/2003 | Xie et al. |
| 6,611,599 B2 | 8/2003 | Natarajan |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,842,862 B2 | 1/2005 | Chow et al. |
| 6,853,726 B1 | 2/2005 | Moskowitz et al. |
| 6,857,078 B2 | 2/2005 | Colvin |
| 6,865,747 B1 | 3/2005 | Mercier |
| 6,931,534 B1 | 8/2005 | Jandel et al. |
| 6,957,330 B1 | 10/2005 | Hughes |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |
| 6,986,063 B2 | 1/2006 | Colvin |
| 6,990,453 B2 | 1/2006 | Wang |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Michak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,647,502 B2 | 1/2010 | Moskowitz |
| 7,647,503 B2 | 1/2010 | Moskowitz |
| 7,664,263 B2 | 2/2010 | Moskowitz |
| 7,743,001 B1 | 6/2010 | Vermeulen |
| 7,761,712 B2 | 7/2010 | Moskowitz |
| 7,779,261 B2 | 8/2010 | Moskowitz |
| 2001/0010078 A1 | 7/2001 | Moskowitz |
| 2001/0029580 A1 | 10/2001 | Moskowitz |
| 2001/0043594 A1 | 11/2001 | Ogawa et al |
| 2002/0009208 A1 | 1/2002 | Alattar |
| 2002/0010684 A1 | 1/2002 | Moskowitz |
| 2002/0026343 A1 | 2/2002 | Duenke |
| 2002/0056041 A1 | 5/2002 | Moskowitz |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0161741 A1 | 10/2002 | Wang et al. |
| 2003/0002862 A1 | 1/2003 | Rodriguez |

| | | |
|---|---|---|
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005575 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2010/0002904 A1 | 1/2010 | Moskowitz |
| 2010/0005308 A1 | 1/2010 | Moskowit |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Matsumoto et al. |
| 2010/0202607 A1 | 8/2010 | Moskowitz |
| 2010/0220861 A1 | 9/2010 | Moskowitz |

FOREIGN PATENT DOCUMENTS

| | | |
|---|---|---|
| EP | 0372601 A1 | 6/1990 |
| EP | 0565947 | 10/1993 |
| EP | 0565947 A1 | 10/1993 |
| EP | 0581317 | 2/1994 |
| EP | 0581317 A2 | 2/1994 |
| EP | 0649261 | 4/1995 |
| EP | 0651554 | 5/1995 |
| EP | 0651554 A | 5/1995 |
| EP | 0872073 | 7/1996 |
| EP | 1547337 | 3/2006 |
| EP | 1354276 | 12/2007 |
| EP | 1354276 B1 | 12/2007 |
| NL | 100523 | 9/1998 |
| NL | 1005523 | 9/1998 |
| WO | WO 95/14289 | 5/1995 |
| WO | WO 9514289 | 5/1995 |
| WO | WO9701892 | 6/1995 |
| WO | 96/29795 | 9/1996 |
| WO | WO 9629795 | 9/1996 |
| WO | WO 9642151 | 12/1996 |
| WO | WO9726733 | 1/1997 |
| WO | 97/24833 | 7/1997 |
| WO | WO 9724833 | 7/1997 |
| WO | WO9726732 | 7/1997 |
| WO | WO 9744736 | 11/1997 |
| WO | WO9802864 | 1/1998 |
| WO | WO98/37513 | 8/1998 |
| WO | WO9837513 | 8/1998 |
| WO | WO 9952271 | 10/1999 |
| WO | WO 99/62044 | 12/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO02003385 A1 | 10/2002 |

OTHER PUBLICATIONS

Menezes, Alfred J., Handbook of Applied Crypography, CRC Press, p. 46, 1997.

Merriam-Webster's Collegiate Dictionary, 10th Ed., Merriam Webster, Inc., p. 207.

Copeland, et al., Real Options:A Practioner's Guide, 2001 pp. 106-107, 201-202, 204-208.

Sarkar, M. "An Assessment of Pricing Mechanisms for the Internet—A Regulatory Imperative", presented MIT Workshop on Internet Economics, Mar. 1995 http://www.press/vmich.edu/iep/works/SarkAssas.html on Mar. 12, 2001.

Crawford, D.W. "Pricing Network Usage:A Market for Bandwith of Market Communication?" presented MIT Workshop on Internet Economics, Mar. 1995 http://www.press.vmich.edu/iep/works/CrawMarket.html on Mar. 12, 2001.

Low, S.H., "Equilibrium Allocation and Pricing of Variable Resources Among User-Suppliers"; 1988. http://www.citesear.nj.nec.com/366503.html, Mar. 12, 2001.

Caronni, Germano, "Assuring Ownership Rights for Digital Images", published proceeds of reliable IT systems, v15 '95, H.H. Bruggemann and W Gerhardt-Hackel (Ed.) Viewing Publishing Company Germany 1995.

Zhao, Jian. "A WWW Service to Embed and Prove Digital Copyright Watermarks", Proc. of the european conf. on Mulitmedia Applications, Services & Techniques Louvain-La-Nevve Belgium May 1996.

Gruhl,Daniel et al.,Echo Hiding. In Proceeding of the Workshop on Information Hiding. No. 1174 in Lecture Notes in Computer Science,Cambridge,England (May/Jun. 1996).

Oomen,A.W.J. et al., A Variable Bit Rate Buried Data Channel for Compact Disc, J.Audio Eng.Sc., vol. 43, No. 1/2, pp. 23-28 (1995).

Ten Kate,W. et al., A New Surround-Stereo-Surround Coding Techniques, J. Audio Eng.Soc., vol. 40, No. 5, pp. 376-383 (1992).

Sklar,Bernard, Digital Communications, pp. 601-603 (1988).

Jayant, N.S. et al., Digital Coding of Waveforms, Prentice Hall Inc., Englewood Cliffs,NJ, pp. 486-509 (1984).

Bender, Walter R. et al.,Techniques for Data Hiding, SPIE Int. Soc. Opt. Eng., vol. 2420, pp. 164-173, 1995.

Schneier, Bruce, Applied Cryptography; 1st Ed., pp. 67-68, 1994.

van Schyndel, et al. A digital Watermark, IEEE Int'l Computer Processing Conference, Austin,TX, Nov. 13-16, 1994, pp. 86-90.

Smith, et al. Modulation and Information Hiding in Images, Springer Verlag, 1st Int'l Workshop, Cambridge, UK, May 30-Jun. 1, 1996, pp. 207-227.

Kutter, Martin et al., Digital Signature of Color Images Using Amplitude Modulation, SPIE-E197, vol. 3022, pp. 518-527.
Puate, Joan et al., Using Fractal Compression Scheme to Embed a Digital Signature into an Image, SPIE-96 Proceedings, vol. 2915, Mar. 1997, pp. 108-118.
Swanson, Mitchell D.,et al., Transparent Robust Image Watermarking, Proc. of the 1996 IEEE Int'l Conf. on Image Processing, vol. 111, 1996, pp. 211-214.
Swanson, Mitchell D., et al. Robust Data Hiding for Images, 7th IEEE Digital Signal Processing Workshop, Leon, Norway. Sep. 1-4, 1996, pp. 37-40.
Zhao, Jian et al., Embedding Robust Labels into Images for Copyright Protection, Proceeding of the Know Right '95 Conference, pp. 242-251.
Koch, E., et al., Towards Robust and Hidden Image Copyright Labeling, 1995 IEEE Workshop on Nonlinear Signal and Image Processing, Jun. 1995 Neos Marmaras pp. 4.
Van Schyandel, et al., Towards a Robust Digital Watermark, Second Asain Image. Processing Conference, Dec. 6-8, 1995,Singapore, vol. 2, pp. 504-508.
Tirkel,A.Z., A Two-Dimensional Digital Watermark, DICTA '95, Univ. of Queensland, Brisbane, Dec. 5-8, 1995, pp. 7.
Tirkel,A.Z., Image Watermarking—A Spread Spectrum Application, ISSSTA '96, Sep. 1996, Mainz, German, pp. 6.
O'Ruanaidh, et al. Watermarking Digital Images for Copyright Protection, IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., The Code Breakers, The MacMillan Company, 1969, pp. xiii, 81-83,513,515,522-526,873.
Boney, et al., Digital Watermarks for Audio Signals, EVSIPCO, 96, pp. 473-480.
Dept. of Electrical Engineering, Del Ft University of Technology, Del ft The Netherlands,Cr.C. Langelaar et al.,Copy Protection for Mulitmedia Data based on Labeling Techniques Jul. 1996 9 pp.
F. Hartung, et al., Digital Watermarking of Raw and Compressed Video, SPIE vol. 2952, pp. 205-213.
Craver, et al., Can Invisible Watermarks Resolve Rightful Ownerships? IBM Research Report, RC 20509 (Jul. 25,1996) 21 pp.
Press, et al., Numerical Recipes In C, Cambridge Univ. Press, 1988, pp. 398-417.
Pohlmann, Ken C., Principles of Digital Audio, 3rd Ed., 1995, pp. 32-37, 40-48,138,147-149,332,333,364, 499-501,508-509,564-571.
Pohlmann, Ken C., Principles of Digital Audio, 2nd Ed., 1991, pp. 1-9, 19-25,30-33,41-48,54-57,86-107,375-387.
Schneier, Bruce, Applied Cryptography, John Wiley & Sons, inc. , New York,1994, pp. 68,69,387-392,1-57,273-275,321-324.
Boney, et al., Digital Watermarks for Audio Signals, Proceedings of the International Conf. on Multimedia Computing and Systems, Jun. 17-23, 1996.Hiroshima. Japan. 0-8186-7436-9196. pp. 473-480.
Johnson, et al., Transform Permuted Watermarking for Copyright Protection of Digital Video, IEEE Globecom 1998, Nov. 8-12, 1998, New York, New York. vol. 2.1998. pp. 684-689 (ISBN 0-7803-4985-7).
Bender, et al., Techniques for Data Hiding, IBM Systems Journal, vol. 35, Nos. 3 & 4,1996, pp. 313-336.
Moskowitz, Bandwith as Currency, IEEE Multimedia, Jan.-Mar. 2003, pp. 14-21.
Tomsich, et al., "Towards a secure and de-centralized digital watermarking infrastrutture for the protection of Intellectual Property", in Electronic Commerce and Web Technologies, Proceedings (ECWEB.
Moskowitz, "What is Acceptable Quality in the Application of Digital Watermarking: Trade-offs of Security, Robustness and Quality", IEEE Computer Society Proceedings of ITCC 2002 Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science.2006. (to appear) 13.
Kocher, et al., "Self Protecting Digital Content", Technical Report from the CRI Content Security Research Initiative, Crytography Research, Inc. 2002-2003. 14 pages.

Sirbu, M. et al., "Net Bill: An Internet Commerce System Optimized for Network Delivered Services", Digest of Papers of the Computer Society Computer Conference. (Spring) Mar. 5, 1995, pp. 20-25 vol. CONF40.
Schunter, M. et al., "A Status Report on the SEMPER framework for Secure Electronic Commerce", Computer Networks and ISDN Systems, 30 Sep. 1998 pp. 1501-1510 vol. 30 No. 16-18 NL North Holland.
Konrad, K. et al., "Trust and Elecronic Commerce—more than a techinal problem," Proceedings of the 18th IEEE Symposium on Reliable Distributed Systems Oct. 19-22, 1999 pp. 360-365 Lausanne.
Kini, A. et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Rivest,et al., PayWord and MicroMint: Two simple micropayment schemes, MIT Laboratory for Computer Science, Cambridge, MA 02139, Apr. 27, 2001, pp. 1-18.
Horowitz, et al., The Art of Electronics, 2nd Ed., 1989, pp. 7.
Delaigle, J.-F., et al. "Digital Watermarking," Proceedings of the SPIE, vol. 2659, Feb. 1, 1996, pp. 99-110 (Abstract).
Schneider, M., et al.:"Robust Content Based Digital Signature for Image Authentication," Proceedings of the International Conference on Image Processina (IC. Lausanne). Sep. 16-19, 1996, pp. 227-230. IEEE ISBN.
Wong, Ping Wah. "A Public Key Watermark for Image Verification and Authentication," IEEE International Conference on Image Processing, vol. 1 Oct. 4-7, 1998 pp. 455-459.
Ross Anderson, "Stretching the Limits of Steganography," LNCS, vol. 1174, May/Jun. 1996; 10 pages, ISBN: 3-540-61996-8.
Joseph J.K. O'Ruanaidh and Thierry Pun, "Rotation, Scale and Translation Invariant Digital Image Watermarking", Submitted to Signal Processing Aug. 21, 1997 19 pages.
Hivest, R. "Chatting and Winnowing: Confidentiality without Encryption", MIT Lab for Computer Science, http://people.csail.mit.edu/rivest/Chaffing.txt, Apr. 24, 1998, 9 pp.
VeriDisc, "The search for a Rational Solution to Digital Rights Management (DRM)", http://64.244.235.240/news/whitepaper/docs/veridisc_white_paper.pdf, 2001, 15 pp.
Cayre, et al.,"Kerckhoff's-Based Embedding Security Classes for WOA Data Hiding". IEEE Transactions on Information Forensics and Security, vol. 3 No. 1, Mar. 2008, 15 pp.
Wayback Machine, dated Aug. 26, 2007, http://web.archive.org/web/20070826151732/http://www.screenplaysmag.com/tabid/96/articleType/ArticleView/articleId/495/Default.aspx/.
"You Tube Copyright Policy: Video Iddentification tool—You Tube Help", accessed Jun. 4, 2009, http://www.google.com/support/youtube/bin/answer.py?h1=en&answer=83766, 3 pp.
PCT International Search Report, completed Sep. 13, 1995; (PCT/US95/08159) (2 pages).
PCT International Search Report, completed Jun. 11, 1996; (PCT/US96/10257) (4 pages).
Supplementary European Search Report, completed Mar. 5, 2004; (EP 96 91 9405) (1 page).
PCT International Search Report, completed Apr. 4, 1997; (PCT/US97/00651) (1 page).
PCT International Search Report, completed May 6, 1997; (PCT/US97/00652) (3 pages).
PCT International Search Report, completed Oct. 23, 1997; (PCT/US97/11455) (1 page).
PCT International Search Report, completed Jul. 12, 1999; (PCT/US99/07262) (3 pages).
PCT International Search Report, completed Jun. 30, 2000; (PCT/US00/06522) (7 pages).
Supplementary European Search Report, completed Jun. 27, 2002; (EP 00 91 9398) (1 page).
PCT International Search Report, date of mailing Mar. 15, 2001; (PCT/US00/18411) (5 pages).
PCT International Search Report, completed Jul. 20, 2001; (PCT/US00/18411) (5 pages).
PCT International Search Report, completed Mar. 20, 2001; (PCT/US00/33126) (6 pages).

PCT International Search Report, completed Jan. 26, 2001; (PCT/US00/21189) (3 pages).
European Search Report, completed Oct. 15, 2007; (EP 07 11 2420) (9 pages).
Arctic Monkeys (Whatever People Say I Am, That's What I'm Not), Domino Recording Co. Ltd., Pre-Release CD image, 2005, 1 page.
Oasis (Dig Out Your Soul), Big Brother Recordings Ltd., Promotion CD image, 2009, 1 page.
U.S. Appl. No. 08/999,766, filed Jul. 23, 1997, entitled "Steganographic Method and Device", published as 7568100 Jul. 28, 2009.
EPO Application No. 96919405.9, entitled "Steganographic Method and Device"; published as EP0872073 (A2), Oct. 21, 1998.
U.S. Appl. No. 11/050,779, filed Feb. 7, 2005, entitled "Steganographic Method and Device", published as 20050177727 A1 Aug. 11, 2005.
U.S. Appl. No. 08/674,726, filed Jul. 2, 1996, entitled "Exchange Mechanisms for Digital Information Packages with Bandwidth Securitization, Multichannel Digital Watermarks, and Key Management", published as 7362775 Apr. 22, 2008.
U.S. Appl. No. 09/545,589, filed Apr. 7, 2000, entitled "Method and System for Digital Watermarking", published as 7007166 Feb. 28, 2006.
U.S. Appl. No. 11/244,213, filed Oct. 5, 2005, entitled "Method and System for Digital Watermarking", published as 2006-0101269 A1 May 11, 2006.
U.S. Appl. No. 11/649,026, filed Jan. 3, 2007, entitled "Method and System for Digital Watermarking", published as 2007-0113094 A1 May 17, 2007.
U.S. Appl. No. 09/046,627, filed Mar. 24, 1998, entitled "Method for Combining Transfer Function with Predetermined Key Creation", published as 6,598,162 Jul. 22, 2003.
U.S. Appl. No. 10/602,777, filed Jun. 25, 2003, entitled "Method for Combining Transfer Function with Predetermined Key Creation", published as 2004-0086119 A1 May 6, 2004.
U.S. Appl. No. 09/053,628, filed Apr. 2, 1998, entitled "Multiple Transform Utilization and Application for Secure Digital Watermarking", 6,205,249 Mar. 20, 2001.
U.S. Appl. No. 09/644,098, filed Aug. 23, 2000, entitled "Multiple Transform Utilization and Application for Secure Digital Watermarking", published as 7,035,409 Apr. 25, 2006.
Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
U.S. Appl. No. 09/767,733, filed Jan. 24, 2001 entitled "Multiple Transform Utilization and Application for Secure Digital Watermarking", published as 2001-0010078 A1 Jul. 26, 2001.
U.S. Appl. No. 11/358,874, filed Feb. 21, 2006, entitled "Multiple Transform Utilization and Application for Secure Digital Watermarking", published as 2006-0140403 A1 Jun. 29, 2006.
U.S. Appl. No. 10/417,231, filed Apr. 17, 2003, entitled "Methods, Systems And Devices For Packet Watermarking And Efficient Provisioning Of Bandwidth", published as 2003-0200439 A1 Oct. 23, 2003.
U.S. Appl. No. 09/789,711, filed Feb. 22, 2001, entitled "Optimization Methods for the Insertion, Protection, and Detection of Digital Watermarks in Digital Data", published as 2001-0029580 A1 Oct. 11, 2001.
U.S. Appl. No. 11/497,822, filed Aug. 2, 2006, entitled "Optimization Methods for the Insertion, Protection, and Detection of Digital Watermarks in Digital Data", published as 2007-0011458 A1 Jan. 11, 2007.
U.S. Appl. No. 11/599,964, filed Nov. 15, 2006, entitled "Optimization Methods for the Insertion, Protection, and Detection of Digital Watermarks in Digital Data", published as 2008-0046742 A1 Feb. 21, 2008.
U.S. Appl. No. 11/599,838, filed Nov. 15, 2006, entitled "Optimization Methods for the Insertion, Protection, and Detection of Digital Watermarks in Digital Data", published as 2007-0226506 A1 Sep. 27, 2007.
U.S. Appl. No. 10/369,344, filed Feb. 18, 2003, entitled "Optimization Methods for the Insertion, Protection, and Detection of Digital Watermarks in Digitized Data", published as 2003-0219143 A1 Nov. 27, 2003.
U.S. Appl. No. 11/482,654, filed Jul. 7, 2006, entitled "Optimization Methods for the Insertion, Protection, and Detection of Digital Watermarks in Digitized Data", published as 2006-0285722 A1 Dec. 21, 2006.
U.S. Appl. No. 09/594,719, filed Jun. 16, 2000, entitled "Utilizing Data Reduction in Steganographic and Cryptographic Systems", published as 7,123,718 Oct. 17, 2006.
U.S. Appl. No. 11/519,467, filed Sep. 12, 2006, entitled "Utilizing Data Reduction in Steganographic and Cryptographic Systems", published as 2007-0064940 A1 Mar. 22, 2007.
U.S. Appl. No. 09/731,040, filed Dec. 7, 2000, entitled "Systems, Methods And Devices For Trusted Transactions", 2002-0010684 A1 Jan. 24, 2002.
U.S. Appl. No. 11/512,701, filed Aug. 29, 2006, entitled "Systems, Methods And Devices For Trusted Transactions", published as 2007-0028113 A1 Feb. 1, 2007.
U.S. Appl. No. 10/049,101, filed Feb. 8, 2002, entitled "A Secure Personal Content Server", published as 7,475,246 Jan. 6, 2009.
PCT Application No. PCT/US00/21189, filed Aug. 4, 2000, entitled, "A Secure Personal Content Server", Pub. No. WO/2001/018628 ; Publication Date: Mar. 15, 2001.
U.S. Appl. No. 09/657,181, filed Sep. 7, 2000, entitled "Method and Device For Monitoring And Analyzing Signals", published as 7,346,472 Mar. 18, 2008.
U.S. Appl. No. 10/805,484, filed Mar. 22, 2004, entitled "Method And Device For Monitoring And Analyzing Signals", published as 2004-0243540 A1 Dec. 2, 2004.
U.S. Appl. No. 09/956,262, filed Sep. 20, 2001, entitled "Improved Security Based on Subliminal and Supraliminal Channels For Data Objects", published as 2002-0056041 A1 May 9, 2002.
U.S. Appl. No. 11/518,806, filed Sep. 11, 2006, entitled "Improved Security Based on Subliminal and Supraliminal Channels for Data Objects", 2008-0028222 A1 Jan. 31, 2008.
U.S. Appl. No. 11/026,234, filed Dec. 30, 2004, entitled "Z-Transform Implementation of Digital Watermarks", published as 2005-0135615 A1 Jun. 23, 2005.
U.S. Appl. No. 11/592,079, filed Nov. 2, 2006, entitled "Linear Predictive Coding Implementation of Digital Watermarks", published as 2007-0079131 A1 Apr. 5, 2007.
U.S. Appl. No. 09/731,039, filed Dec. 7, 2000, entitled "System and Methods for Permitting Open Access to Data Objects and for Securing Data within the Data Objects", published as 2002-0071556 A1 Jun. 13, 2002.
U.S. Appl. No. 11/647,861, filed Dec. 29, 2006, entitled "System and Methods for Permitting Open Access to Data Objects and for Securing Data within the Data Objects", published as 2007-0110240 A1 May 17, 2007.
Schreier, Bruce, Applied Cryptography, 2nd Ed., John Wiley & Sons, pp. 9-10, 1996.
Menezes, Alfred J., Handbook of Applied Cryptography, CRC Press, p. 46, 1997.
1997, Merriam-Webster's Collegiate Dictionary, 10th Ed., Merriam Webster, Inc., p. 207.
Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on Mar.
Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.

Zhao, Jian. "A WWW Service to Embed and Prove Digital Copyright Watermarks", Proc. of the European conf. on Multimedia Applications, Services & Techniques Louvain-La-Nevve Belgium May 1996.

Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.AudioEng. Sc., vol. 43, No. 1/2, pp. 23-28 (1995).

Ten Kate, W. et al., A New Surround-Stereo-Surround Coding Techniques, J. Audio Eng.Soc., vol. 40,No. 5,pp. 376-383 (1992).

Gerzon, Michael et al., A High Rate Buried Data Channel for Audio CD, presentation notes, Audio Engineering Soc. 94th Convention (1993).

Sklar, Bernard, Digital Communications, pp. 601-603 (1988).

Jayant, N. S. et al., Digital Coding of Waveforms, Prentice Hall Inc., Englewood Cliffs, NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

Ten Kate, W. et al., "Digital Audio Carrying Extra Information", IEEE, CH 2847-2/90/0000-1097, (1990).

Van Schyndel, et al., "A digital Watermark," IEEE Int'l Computer Processing Conference, Austin,TX, Nov. 13-16, 1994, pp. 86-90.

Smith, et al. "Modulation and Information Hiding in Images", Springer Verlag, 1st Int'l Workshop, Cambridge, UK, May 30-Jun. 1, 1996, pp. 207-227.

1997, Kutter, Martin et al., "Digital Signature of Color Images Using Amplitude Modulation", SPIE-E197, vol. 3022, pp. 518-527.

Puate, Joan et al., "Using Fractal Compression Scheme to Embed a Digital Signature into an Image", SPIE-96 Proceedings, vol. 2915, Mar. 1997, pp. 108-118.

Swanson, Mitchell D.,et al., "Transparent Robust Image Watermarking", Proc. of the 1996 IEEE Int'l Conf. on Image Processing, vol. 111, 1996 , pp. 211-214.

Swanson, Mitchell D., et al. "Robust Data Hiding for Images", 7th IEEE Digital Signal Processing Workshop, Leon, Norway. Sep. 1-4, 1996, pp. 37-40.

Unknown, Zhao, Jian et al., "Embedding Robust Labels into Images for Copyright Protection", Proceeding of the Know Right '95 Conference, pp. 242-251.

Koch, E., et al., "Towards Robust and Hidden Image Copyright Labeling", 1995 IEEE Workshop on Nonlinear Signal and Image Processing, Jun. 1995 Neos Marmaras pp. 4.

Van Schyandel, et al., "Towards a Robust Digital Watermark", Second Asain Image Processing Conference, Dec. 6-8, 1995, Singapore, vol. 2, pp. 504-508.

Tirkel,A.Z., "A Two-Dimensional Digital Watermark", DICTA '95, Univ. of Queensland, Brisbane, Dec. 5-8, 1995, pp. 7.

Tirkel,A.Z., "Image Watermarking—A Spread Spectrum Application", ISSSTA '96, Sep. 1996, Mainz, German, pp. 6.

O'Ruanaidh, et al. "Watermarking Digital Images for Copyright Protection", IEEE Proceedings, vol. 143, No. 4, Aug. 1996, pp. 250-256.

Unknown, Cox, et al., Secure Spread Spectrum Watermarking for Multimedia, NEC Research Institute, Techinal Report 95-10, pp. 33.

Kahn, D., "The Code Breakers", The MacMillan Company, 1969, pp. xIII, 81-83, 513, 515, 522-526, 863.

Boney, et al., Digital Watermarks for Audio Signals, EVSIPCO, 96, pp. 473-480 (Mar. 14, 1997).

Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.

Unknown, F. Hartung, et al., "Digital Watermarking of Raw and Compressed Video", SPIE vol. 2952, pp. 205-213.

Craver, et al., "Can Invisible Watermarks Resolve Rightful Ownerships?", IBM Research Report, RC 20509 (Jul. 25, 1996) 21 pp.

Press, et al., "Numerical Recipes in C", Cambridge Univ. Press, 1988, pp. 398-417.

Pohlmann, Ken C., "Principles of Digital Audio", 3rd Ed., 1995, pp. 32-37, 40-48:138, 147-149, 332, 333, 364, 499-501, 508-509, 564-571.

Pohlmann, Ken C., "Principles of Digital Audio", 2nd Ed., 1991, pp. 1-9, 19-25, 30-33, 41-48, 54-57, 86-107, 375-387.

Schneier, Bruce, Applied Cryptography, John Wiley & Sons, Inc., New York, 1994, pp. 68, 69, 387-392, 1-57, 273-275, 321-324.

Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.

Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).

Rivest, et al., "Pay Word and Micromint: Two Simple Micropayment Schemes," MIT Laboratory for Computer Science, Cambridge, MA, May 7, 1996 pp. 1-18.

Bender, et al., "Techniques for Data Hiding", IBM Systems Journal, (1996) vol. 35, Nos. 3 & 4,1996, pp. 313-336.

Moskowitz, "Bandwith as Currency", IEEE Multimedia, Jan.-Mar. 2003, pp. 14-21.

Moskowitz, Multimedia Security Technologies for Digital Rights Management, 2006, Academic Press, "Introduction—Digital Rights Management" pp. 3-22.

Rivest, et al., "PayWord and Micromint: Two Simple Micropayment Schemes," MIT Laboratory for Computer Science, Cambridge, MA, Apr. 27, 2001, pp. 1-18.

Tomsich, et al., "Towards a secure and de-centralized digital watermarking infrastructure for the protection of Intellectual Property", in Electronic Commerce and Web Technologies, Proceedings (ECWEB)(2000).

Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science 2006 (to appear) 13.

Kocher, et al., "Self Protecting Digital Content", Technical Report from the CRI Content Security Research Initiative, Cryptography Research, Inc. 2002-2003 14 pages.

Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.

Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.

Konrad, K. et al., "Trust and Electronic Commerce—more than a technical problem," Proceedings of the 18th IEEE Symposium on Reliable Distributed Systems Oct. 19-22, 1999, pp. 360-365 Lausanne.

Kine, et al., "Trust in Electronic Commerce: Definition and Theoretical Considerations", Proceedings of the 31st Hawaii Int'l Conf on System Sciences (Cat. No. 98TB100216). Jan. 6-9, 1998, pp. 51-61. Los.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.

European Search Report & European Search Opinion in EP07112420.

Staind (The Singles 1996-2006), Warner Music—Atlantic, Pre-Release CD image, 2006, 1 page.

Radiohead ("Hail To The Thief"), EMI Music Group—Capitol, Pre-Release CD image, 2003, 1 page.

U.S. Appl. No. 60/169,274, filed Dec. 7, 1999, entitled "Systems, Methods And Devices For Trusted Transactions".
U.S. Appl. No. 60/234,199, filed Sep. 20, 2000, "Improved Security Based on Subliminal and Supraliminal Channels For Data Objects".
U.S. Appl. No. 09/671,739, filed Sep. 29, 2000, entitled "Method And Device For Monitoring And Analyzing Signals".
Tirkel, AZ., "A Two-Dimensional Digital Watermark", Scientific Technology, 686, 14, date unknown.
EP0581317A2, Moved to Foreign Patent Pubs.
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
Oasis (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP502 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoffs-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/tabid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
U.S. Appl. No. 12/665,002, filed Dec. 22, 2009, entitled "Method for Combining Transfer Function with Predetermined Key Creation", published as 20100182570 A1 Jul. 22, 2010.
U.S. Appl. No. 12/592,331, filed Nov. 23, 2009, entitled "Optimization Methods for the Insertion, Protection, and Detection of Digital Watermarks in Digital Data", published as 20100077220 A1 Mar. 25, 2010.
U.S. Appl. No. 12/590,553, filed Nov. 10, 2009, entitled "Optimization Methods for the Insertion, Protection, and Detection of Digital Watermarks in Digital Data", published as 20100077219 A1 Mar. 25, 2010.
U.S. Appl. No. 12/590,681, filed Nov. 12, 2009, entitled "Optimization Methods for the Insertion, Protection, and Detection of Digital Watermarks in Digital Data", published as 20100064140 A1 Mar. 11, 2010.
U.S. Appl. No. 12/655,036, filed Dec. 22, 2009, entitled "Utilizing Data Reduction in Steganographic and Cryptographic Systems", published as 20100153734 A1 Jun. 17, 2010.
U.S. Appl. No. 12/655,357, filed Dec. 22, 2009, entitled "Method And Device For Monitoring And Analyzing Signals", published as 20100106736 A1 Apr. 29, 2010.
PCT Application No. PCT/US95/08159, filed Jun. 26, 1995, entitled, "Digital Information Commodities Exchange with Virtual Menuing", published as WO/1997/001892; Publication Date: Jan. 16, 1997.
PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.
PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
EPO Divisional Patent Application No. 07112420.0, entitled "Steganographic Method and Device" corresponding to PCT Application No. PCT/US96/10257, published as WO/1996/042151, Dec. 27, 1996.
U.S. Appl. No. 60/222,023 filed Jul. 31, 2007 entitled "Method and apparatus for recognizing sound and signals in high noise and distortion".
U.S. Appl. No. 11/458,639, filed Jul. 19, 2006 entitled "Methods and Systems for Inserting Watermarks in Digital Signals", published as 20060251291 A1 Nov. 9, 2006.
"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham,com/pubs-hacking-dict.html.
Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.

UTILIZING DATA REDUCTION IN STEGANOGRAPHIC AND CRYPTOGRAPHIC SYSTEM

CROSS REFERENCE TO RELATED APPLICATION

This application is a continuation of U.S. patent application Ser. No. 11/519,467, filed Sep. 12, 2006 now U.S. Pat. No. 7,664,264 which is a divisional of U.S. patent application Ser. No. 09/594,719 (issued as U.S. Pat. No. 7,123,718), filed Jun. 16, 2000, which is a continuation-in-part of International Application No. PCT/US00/06522, filed Mar. 14, 2000, which PCT application claimed priority to U.S. Provisional Application No. 60/125,990, filed Mar. 24, 1999. The previously identified patents and/or patent applications are hereby incorporated by reference, in their entireties. This application also is related to the following applications: U.S. patent application Ser. No. 09/046,627 (issued as U.S. Pat. No. 6,598,162), filed Mar. 24, 1998, entitled "Method for Combining Transfer Function with Predetermined Key Creation"; U.S. patent application Ser. No. 09/053,628 (issued as U.S. Pat. No. 6,205,249), filed Apr. 2, 1998, entitled "Multiple Transform Utilization and Application for Secure Digital Watermarking"; U.S. Provisional Patent Application Ser. No. 60/169,274 (which corresponds to U.S. patent application Ser. No. 09/731,040 which issued as U.S. Pat. No. 7,159,116), filed Dec. 7, 1999, entitled "Systems, Methods and Devices for Trusted Transactions"; and U.S. Patent Application Ser. No. 60/147,134 (which corresponds to U.S. patent application Ser. No. 10/049,101 which issued as U.S. Pat. No. 7,475,246), filed Aug. 4, 1999, entitled, "A Secure Personal Content Server." All of the patent applications previously identified in this paragraph are hereby incorporated by reference, in their entireties.

FIELD OF THE INVENTION

This invention relates to digital signal processing, and more particularly to a method and a system for encoding at least one digital watermark into a signal as a means of conveying information relating to the signal and also protecting against unauthorized manipulation or use of the signal.

BACKGROUND OF THE INVENTION

Many methods and protocols are known for transmitting data in digital form for multimedia applications (including computer applications delivered over public networks such as the interne or World Wide Web ("WWW"). These methods may include protocols for compression of data, such that it may more readily and quickly be delivered over limited bandwidth data lines. Among standard protocols for data compression of digital files may be mentioned the MPEG compression standards for audio and video digital compression, promulgated by the Moving Picture Experts Group. Numerous standard reference works and patents discuss such compression and transmission standards for digitized information.

Digital watermarks help to authenticate the content of digitized multimedia information, and can also discourage piracy. Because piracy is clearly a disincentive to the digital distribution of copyrighted content, establishment of responsibility for copies and derivative copies of such works is invaluable. In considering the various forms of multimedia content, whether "master," stereo, NTSC video, audio tape or compact disc, tolerance of quality will vary with individuals and affect the underlying commercial and aesthetic value of the content. It is desirable to tie copyrights, ownership rights, purchaser information or some combination of these and related data into the content in such a manner that the content must undergo damage, and therefore reduction of its value, with subsequent, unauthorized distribution, commercial or otherwise. Digital watermarks address many of these concerns. A general discussion of digital watermarking as it has been applied in the art may be found in U.S. Pat. No. 5,687,236 (whose specification is incorporated in whole herein by reference).

Such prior art applications have been drawn to providing basic digital watermarking functionality. For instance, it has been known to provide an apparatus or method for encoding or decoding independent information, including a digital watermark, represented as a series of data bits into or out of a series of digitized samples, wherein the apparatus contained:
  a) a sample buffer for holding, accessing, and transforming digitized samples;
  b) a digital signal processor for performing sample modifications and spectral transformations;
  c) a memory for storing information representing:
    1) a mask set, including one or more masks,
    2) a start of message delimiter (wherein at least one of the masks in question, or the start of message delimiter, are random or pseudo-random),
    3) a mask calculation buffer,
    4) a first buffer holding the independent information,
    5) an information bit index,
    6) a message size, representing an amount of information,
    7) one index into each of said one or more masks,
    8) a state of a decoding process,
    9) a table representing a map function,
    10) a flag indicating whether a complete message has been decoded or encoded,
    11) a number of samples for reading into said sample buffer, and
    12) a flag indicating a size of a message that has been decoded;
  d) a first input for acquiring a plurality of digital samples;
  e) a first output for outputting a plurality of modified digital samples;
  f) a second input for inputting a plurality of values to the one or more masks, the start of message delimiter, the mask calculation buffer, the first buffer, the table and the number of samples;
  g) a third output for outputting the independent information stored in the first buffer as a result of the decoding process and a value of the state of the decoding process to an attached digital circuit;
  h) one or more data buses for transferring information from:
    1) the first input to the sample buffer,
    2) the sample buffer to the digital signal processor,
    3) the digital signal processor to the sample buffer,
    4) the sample buffer to the first output,
    5) the second input to the memory, and
    6) the memory to the third output; and
  i) a clock for generating a clock signal for driving the digital signal processor and the data bus(es), and for controlling the operation of the apparatus.

Further applications of basic digital watermarking functionality have also been developed. Examples of such applications are shown in U.S. Pat. No. 5,889,868 (whose specification is incorporated in whole herein by reference). Such applications have been drawn, for instance, to implementations of digital watermarks that were deemed most suited to particular transmissions, or particular distribution and storage mediums, given the nature of digitally sampled audio, video, and other multimedia works. There have also been developed techniques for adapting watermark application parameters to the individual characteristics of a given digital sample stream. and for implementation of digital watermarks that are feature-based—i.e., a system in which watermark information is not carried in individual samples, but is carried in the relationships between multiple samples, such as in a waveform shape. For instance, natural extensions may be added to digital watermarks that may also separate frequencies (color or audio), channels in 3D while utilizing discreteness in feature-based encoding only known to those with pseudorandom keys (i.e., cryptographic keys) or possibly tools to access such information, which may one day exist on a quantum level.

A matter of general weakness in digital watermark technology relates directly to the manner of implementation of the watermark. Many approaches to digital watermarking leave detection and decode control with the implementing party of the digital watermark, not the creator of the work to be protected. This weakness removes proper economic incentives for improvement of the technology. One specific form of exploitation mostly regards efforts to obscure subsequent watermark detection. Others regard successful over encoding using the same watermarking process at a subsequent time. Yet another way to perform secure digital watermark implementation is through "key-based" approaches.

This paper draws a distinction between a "forensic watermark," based on provably-secure methods, and a "copy control" or "universal" watermark which is intended to be low cost and easily implemented into any general computing or consumer electronic device. A watermark can be forensic if it can identify the source of the data from which a copy was made. For example, assume that digital data are stored on a disk and provided to "Company A" (the "A disk"). Company A makes an unauthorized copy and delivers the copy to "Company B" (the "B disk"). A forensic watermark, if present in the digital data stored on the "A disk," would identify the "B disk" as having been copied from the "A disk."

On the other hand, a copy control or universal watermark is an embedded signal which is governed by a "key" which may be changed (a "session key") to increase security, or one that is easily accessible to devices that may offer less than strict cryptographic security. The "universal" nature of the watermark is the computationally inexpensive means for accessing or other associating the watermark with operations that can include playback, recording or manipulations of the media in which it is embedded.

A fundamental difference is that the universality of a copy control mechanism, which must be redundant enough to survive many signal manipulations to eliminate most casual piracy, is at odds with the far greater problem of establishing responsibility for a given instance of a suspected copying of a copyrighted media work. The more dedicated pirates must be dealt with by encouraging third party authentication with "forensic watermarks" or those that constitute "transactional watermarks" (which are encoded in a given copy of said content to be watermarked as per the given transaction).

The goal of a digital watermark system is to insert a given information signal or signals in such a manner as to leave little or no evidence of the presence of the information signal in the underlying content signal. A separate but equal goal is maximizing the digital watermark's encoding level and "location sensitivity" in the underlying content signal such that the watermark cannot be removed without damage to the content signal.

One means of implementing a digital watermark is to use key-based security. A predetermined or random key can be generated as a map to access the hidden information signal. A key pair may also be used. With a typical key pair, a party possesses a public and a private key. The private key is maintained in confidence by the owner of the key, while the owner's public key is disseminated to those persons in the public with whom the owner would regularly communicate. Messages being communicated, for example by the owner to another, are encrypted with the private key and can only be read by another person who possesses the corresponding public key. Similarly, a message encrypted with the person's public key can only be decrypted with the corresponding private key. Of course, the keys or key pairs may be processed in separate software or hardware devices handling the watermarked data.

Two conventional techniques for providing key-based confidentiality and/or authentication currently in use involve reciprocal and non-reciprocal encrypting. Both systems use non-secret algorithms to provide encryption and decryption, and keys that are used by the algorithm.

In reciprocal algorithm systems, such as DES, the same key and algorithm is used both to encrypt and decrypt a message. To assure confidentiality and authenticity, the key should be known only to the sending and receiving computers, and were traditionally provided to the systems by "secure" communication, such as courier.

In the prior art there have been developed systems wherein a common key may be developed by the sender and receiver using non-secure communications. In such systems, as described in U.S. Pat. Nos. 4,200,770, 5,375,169 and 5,583,939, each party to a communication generates a numerical sequence, operates on the sequence and transfers the result to the other party. By further operation using the transferred result and the locally generated sequence, each party can develop the identical enciphering key, which cannot be obtained from the transferred results alone.

As implemented for use over the interne, the most common prior art encryption systems are those denoted by the Secure Socket Layer (SSL) and IPSEC protocols.

In non-reciprocal systems, such as described in U.S. Pat. No. 4,218,582, a first party to a communication generates a numerical sequence and uses that sequence to generate non-reciprocal and different encrypting and decrypting keys. The encrypting key is then transferred to a second party in a non-secure communication. The second party uses the encrypting key (called a public key because it is no longer secure) to encrypt a message that can only be de-crypted by the decrypting key retained by the first party. The key generation algorithm is arranged such that the decrypting key cannot be derived from the public encrypting key. Similar methods are known for using non-reciprocal keys for authentication of a transmission. In this application, the non-secure "public" key is used to a message that has been encrypted using a secure "private" key known only to the originating party. In this method the receiving party has assurance that the origination of the message is the party who has supplied the "public" decrypting key. Prior art systems for key generation have often relied upon supposedly-random or quasi-random numbers generated by a fixed mathematical algorithm.

Adaptations of key systems specifically used in conjunction with digital watermarking have been developed, as disclosed in, for example, U.S. Pat. No. 5,822,432 (which is incorporated in whole herein by reference). Such adaptations have included, for instance, providing methods for the human-assisted generation and application of pseudorandom keys for the purpose of encoding and decoding digital watermarks to and from a digitized data stream. In such methods, a pseudorandom key and key application "envelope" may be generated and stored using guideline parameters input by a human engineer interacting with a graphical representation of the digitized data stream. Key "envelope" information is permanently associated with the pseudo-random binary string comprising the key. Key and "envelope" information may then be applied in a digital watermark system to the encoding and decoding of digital watermarks. Such a method can improve encoding and decoding with digital watermarks by providing: separation of the encoder from the decoder; increased information capacity (relative to spread spectrum methods); destruction or degradation of content when attempts to erase watermarks take place; detection of presence of watermarks without ability to access watermark information; multi-channel watermark capability; use of various classes of keys for watermark access control; support for alternative encoding, decoding, or other component algorithms; and/or use of a digital notary to authenticate and time stamp watermark certificates.

While, as described above, various prior art approaches do exist for implementation of digital watermarking (though not necessarily for forensic or copy control use), there are additional desirable features for digital watermarking systems that are not currently believed to be available. For instance, it would be desirable to be able to secure a data signal by using data reduction techniques to reduce the data signal into a reduced data signal; in conjunction with cryptographic techniques, so that an output signal can reliably and efficiently be securely delivered.

It would further be advantageous to user remainder signals (produced by data reduction techniques) as a vehicle for performing encryption upon and using in conjunction with encrypting/decrypting of a data signal to be secured.

It would likewise be desirable to combine data reduction techniques to reduce a data signal into a reduced data signal; produce a remainder signal from the data signal; and then embed complementary watermarks in reduced data signal and the remainder signal, for effective and secure delivery of an output signal.

It would still further be desirable to combine scrambling techniques in conjunction with data reduction techniques such that data signals can be reduced and transmitted on a secured basis.

It would likewise be desirable to provide cost-efficient and universal systems for digital watermarking, and to provide systems adaptable both to copy protection and forensic tracing of "pirated" data signals to detect and deter unauthorized copyists thereof.

It would also be desirable to provide a system of digital watermarking that is highly compatible with known and future methods for compression of data used in conjunction with electronic transmission thereof. It would further be desirable to provide digital watermarking techniques in conjunction with known and effective "key" systems for cryptography and data signal protection.

The prior art does not meet these needs.

SUMMARY OF THE INVENTION

The present invention provides a method of securing a data signal which comprises the steps of: applying a data reduction technique to reduce the data signal into a reduced data signal; embedding a first watermark into said reduced data signal to produce a watermarked, reduced data signal; and adding said watermarked, reduced data signal to said remainder signal to produce an output signal.

The present invention also provides a method of securing a data signal which comprises the steps of: applying a data reduction technique to reduce the data signal into a reduced data signal; subtracting said reduced data signal from the data signal to produce a remainder signal; embedding a first watermark into said reduced data signal to produce a watermarked, reduced data signal; embedding a second watermark into said remainder signal; to produce a watermarked remainder signal; and adding said watermarked, reduced data signal to said watermarked remainder signal to produce an output signal.

The present invention also provides a method of securing a data signal which comprises the steps of: applying a data reduction technique to reduce the data signal into a reduced data signal; subtracting said reduced data signal from the data signal to produce a remainder signal; using a first scrambling technique to scramble said reduced data signal to produce a scrambled, reduced data signal; using a second scrambling technique to scramble said remainder signal to produce a scrambled remainder signal; and adding said scrambled, reduced data signal to said scrambled remainder signal to produce an output signal.

The present invention also provides a method of securing a data signal which comprises the steps of: applying a data reduction technique to reduce the data signal into a reduced data signal; subtracting said reduced data signal from the data signal to produce a remainder signal; using a first cryptographic technique to encrypt the reduced data signal to produce an encrypted, reduced data signal; using a second cryptographic technique to encrypt the remainder signal to produce an encrypted remainder signal; and adding said encrypted, reduced data signal to said encrypted remainder signal to produce an output signal.

The present invention also supplies a system for securing a data signal which comprises: means to apply a data reduction technique to reduce the data signal into a reduced data signal; means to subtract said reduced data signal from the data signal to produce a remainder signal; means to apply a first cryptographic technique to encrypt the reduced data signal to produce an encrypted, reduced data signal; means to apply a second cryptographic technique to encrypt the remainder signal to produce an encrypted remainder signal; and means to add said encrypted, reduced data signal to said encrypted remainder signal to produce an output signal.

The present invention also supplies a system for securing a data signal which comprises: (a) a computer processor; (b) at least one computer memory; (c) a data reduction algorithm; and (d) at least one digital watermarking algorithm, wherein said computer processor is supplied with programming in conjunction with said computer memory: (I) to apply said data reduction algorithm to the data signal to yield a reduced data signal; and to subtract said reduced data signal from the data signal to produce a remainder signal; (II) to embed a first watermark into said reduced data signal by application of said at least one digital watermarking algorithm to produce a watermarked remainder signal; and (IV) to add said watermarked, reduced data signal to said watermarked remainder signal to produce an output signal.

The present invention also provides a method of securing a data signal which comprises the steps of: evaluating the data signal to determine its characteristics and reducibility; selecting at least one appropriate data reduction technique for the data signal based on the data signal's characteristics; applying said at least one appropriate data reduction technique to the data signal to produce a reduced data signal; embedding at least one digital watermark in the reduced data signal; and supplying an output signal corresponding to the data signal, said output signal comprising said watermark and said reduced data signal.

The present invention also supplies a method for the protection of a data signal, comprising the steps of: (a) defining and analyzing a plurality of data substreams within the data signal; (b) associating at least one key or key pair with data reduction digital watermarking for at least one of said data substreams; (c) employing said at least one key or key pairs for at least one step selected from the group of: (i) identifying at least one associated watermark; (ii) encoding at least one associated watermark; (iii) detecting at least one associated watermark; or (iv) decoding at least one associated watermark.

A method for protected distribution of a data file is also provided, which method comprises: (a) embedding one or more digital watermarks in the data file using data reduction techniques in creating said digital watermark; (b) and distributing the digitally watermarked file to an end user.

Also provided is a method for analyzing a data signal that has been embedded with at least one digital watermark using a data reduction technique, said method comprising: receiving the data signal; processing the data signal to detect information relative to the digital watermark; analyzing the detected information to determine if the output of the data signal is authorized; and outputting said data signal if the detected information establishes that output is authorized.

Also provided is a device for analyzing a data signal that has been embedded with at least one digital watermark using a data reduction technique, said device comprising: an interface for receiving the data signal; a detector for processing the data signal to detect information relative to the at least one digital watermark; an analyzer to analyze the detected information to determine if output of the data signal is authorized or unauthorized; and an signal generator to output data if the detected information establishes that output is authorized.

There are two design goals in an overall digital watermarking system's low cost, and universality. Ideally, a method for encoding and decoding digital watermarks in digitized media for copy control purposes should be inexpensive and universal. This is essential in preventing casual piracy. On the other hand, a more secure form of protection, such as a "forensic watermarks," can afford to be computationally intensive to decode, but must be unaffected by repeated re-encoding of a copy control watermark. An ideal method for achieving these results would separate the signal into different areas, each of which can be accessed independently. The embedded signal or may simply be "watermark bits" or "executable binary code," depending on the application and type of security sought. Improvements to separation have been made possible by enhancing more of the underlying design to meet a number of clearly problematic issues.

The present invention interprets the signal as a stream which may be split into separate streams of digitized samples or may undergo data reduction (including both lossy and lossless compression, such as MPEG lossy compression and Meridian's lossless compression, down sampling, common to many studio operations, or any related data reduction process). The stream of data can be digital in nature, or may also be an analog waveform (such as an image, audio, video, or multimedia content). One example of digital data is executable binary code. When applied to computer code, the present invention allows for more efficient, secure, copyright protection when handling functionality and associations with predetermined keys and key pairs in software applications or the machine readable versions of such code in microchips and hardware devices. Text may also be a candidate for authentication or higher levels of security when coupled with secure key exchange or asymmetric key generation between parties. The subsets of the data stream combine meaningful and meaningless bits of data which may be mapped or transferred depending on the application intended by the implementing party. The present invention utilizes data reduction to allow better performance in watermarking as well as cryptographic methods concerning binary executable code, its machine readable form, text and other functionality-based or communication-related applications. Some differences may simply be in the structure of the key itself, a pseudo random or random number string or one which also includes additional security with special one way functions or signatures saved to the key. The key may also be made into key pairs, as is discussed in other disclosures and patents referenced herein. The present invention contemplates watermarks as a plurality of digitized sample streams, even if the digitized streams originate from the analog waveform itself. The present invention also contemplates that the methods disclosed herein can be applied to non-digitized content. Universally, data reduction adheres to some means of "understanding" the reduction. This disclosure contemplates data reduction which may include down sampling, lossy compression, summarization or any means of data reduction as a novel means to speed up watermarking encode and decode operations. Many forms of data reduction rely upon sampling of a data signal, for instance frequency or time sampling of a digital audio or video signal. For example, a signal may be sampled on a regular basis every x fractions of a second, where x is arbitrarily chosen, such that representative data slices of the signal are obtained. Other data reduction techniques include bit depth reduction. Bit depth reduction relies on the fact that when measuring items, scales of different degrees of precision can be used. For example, one can measure things on a scale with three division marks (zero to two), or on a scale of the same magnitude with ten division marks (zero to nine). Scales with more divisions are of higher precision than scales with fewer divisions. On a computer, because of processing and storage limitations, numerical values (e.g., numerical values relating to a digitized signal) are also represented with varying degrees of precision. For example, one can use two bits (a scale of zero to three) to represent a numerical value or use five bits (a scale of zero to thirty-one) to represent the same numerical value. The number of bits used to represent a numerical value is generally referred to as the "bit depth." Numerical data may be reduced for storage or transmission by reduction of the bit depth scale.

While any of a number of different data reduction techniques can be used in conjunction with the present invention, essentially a lossy method for data reduction yields the best results for encode and decode operations. Data reduction methods should be appropriately chosen with an eye toward the particular type of data signal being reduced. Some data signals may more readily be reduced than others. For instance, when the data reduction technique chosen is a compression technique, it will be realized that not all data signals or files are equally compressible. For example, there are limits to the degree to which aesthetic information (such as music or video signals) may be compressed without losing their aesthetic or informational value. Thus, in practicing the present invention, techniques can be applied for intelligent selection of data reduction, and differential data reduction techniques can be selected for differential substreams of an aggregate data stream. For example, a computer processor implementing the present invention for protection of a data signal stream comprising, say, both video and text portions, can be programmed to "split" the aggregate data stream into video and text signal substreams, and to apply a first data reduction algorithm most suitable for video data to the first substream, while applying a second data reduction algorithm most suitable for text data to the second substream.

It is desirable to have both copy control and forensic watermarks in the same signal to address the needs of the hardware, computer, and software industries while also providing for appropriate security to the owners of the copyrights. This will become clearer with further explanation of the sample embodiments discussed herein.

The present invention also contemplates the use of data reduction for purposes of speedier and more tiered forms of security, including combinations of these methods with transfer function functions. In many applications, transfer functions (e.g., scrambling), rather than mapping functions (e.g., watermarking), are preferable or can be used in conjunction with mapping. With "scrambling," predetermined keys are associated with transfer functions instead of mapping functions, although those skilled in the art may recognize that a transfer function is simply a subset of mask sets encompassing mapping functions. It is possible that tiered scrambling with data reduction or combinations of tiered data reduction with watermarking and scrambling may indeed increase overall security to many applications.

The use of data reduction can improve the security of both scrambling and watermarking applications. All data reduction methods include coefficients which affect the reduction process. For example, when a digital signal with a time or space component is down sampled, the coefficient would be the ratio of the new sample rate to the original sample rate. Any coefficients that are used in the data reduction can be randomized using the key, or key pair, making the system more resistant to analysis. Association to a predetermined key or key pair and additional measure of security may include biometric devices, tamper proofing of any device utilizing the invention, or other security measures.

Tests have shown that the use of data reduction in connection with digital watermarking schemes significantly reduces the time required to decode the watermarks, permitting increases in operational efficiency.

Particular implementations of the present invention, which have yielded extremely fast and inexpensive digital watermarking systems, will now be described. These systems may be easily adapted to consumer electronic devices, general purpose computers, software and hardware. The exchange of predetermined keys or key pairs may facilitate a given level of security. Additionally, the complementary increase in security for those implementations where transfer functions are used to "scramble" data, is also disclosed.

BRIEF DESCRIPTION OF THE FIGURES

For a more complete understanding of the invention and some advantages thereof, reference is now made to the following descriptions taken in connection with the accompanying drawings in which.

DETAILED DESCRIPTION OF THE PREFERRED EMBODIMENTS

Figure 1:
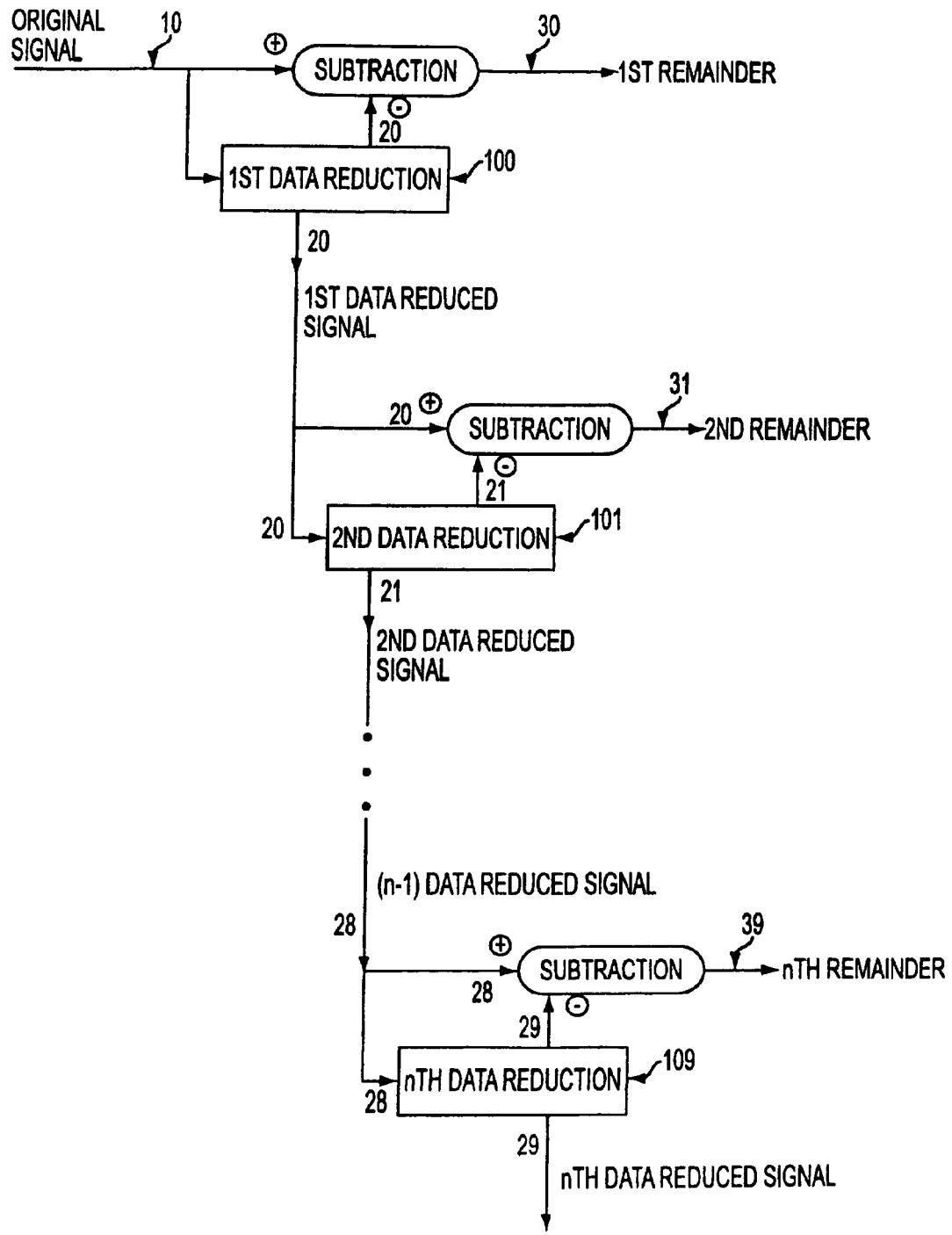
FIG. 1 is a functional block diagram that shows a signal processing system that generates "n" remainder signals and "n" data reduced signals.

The embodiments of the present invention and its advantages are best understood by referring to the drawings, like numerals being used for like and corresponding parts of the various drawings.

An Overview

A system for achieving multiple levels of data reduction is illustrated in FIG. 1. An input signal 10 (for example, instructional text, executable binary computer code, images, audio, video, multimedia or even virtual reality imaging) is subjected to a first data reduction technique 100 to generate a first data reduced signal 20. First data reduced signal 20 is then subtracted from input signal 10 to generate a first remainder signal 30.

First data reduced signal 20 is subjected to a second data reduction technique 101 to generate a second data reduced signal 21. Second data reduced signal 21 is then subtracted from first data reduced signal 20 to generate a second remainder signal 31.

Each of the successive data reduced signals is, in turn, interactively subjected to data reduction techniques to generate a further data reduced signal, which, in turn, is subtracted from its respective parent signal to generate another remainder signal. This process is generically described as follows. An (n−1) data reduced signal 28 (i.e, a signal that has been data reduced n−1 times) is subjected to an nth data reduction technique 109 to generate an nth data reduced signal 29. The nth data reduced signal 29 is then subtracted from the (n−1) data reduced signal 28 to produce an $n^{th}$ remainder signal 39.

An output signal can be generated from the system illustrated in FIG. 1 in numerous ways. For example, each of the n remainder signals (which, through represented by reference numerals 30-39, are not intended to be limited to 10 signals though n must obviously be a finite number, and as a practical matter will usually be comparatively small) and the $n^{th}$ data signal may optionally subjected to a watermarking technique, or even optionally subjected to a encryption technique, and each of the (n+1) signals (whether watermarked or encrypted, or otherwise untouched) may then be added together to form an output signal. By way of more particular examples, each of the (n+1) signals (i.e., the n remainder signals and the $n^{th}$ data reduced signal) can be added together without any encryption or watermarking to form an output signal; or one or more of the (n+1) signals may be watermarked and then all (n+1) signals may be added together; or one or more of the (n+1) signals may be encrypted and then all (n+1) signals may be added together. It is anticipated that between these three extremes lie numerous hybrid combinations involving one or more encryptions and one or more watermarkings.

Each level may be used to represent a particular data density. E.g., if the reduction method is down-sampling, for a DVD audio signal the first row would represent data sampled at 96 kHz, the second at 44.1 kHz., the third at 6 kHz., etc. There is only an issue of deciding what performance or security needs are contemplated when undertaking the data reduction process and choice of which types of keys or key pairs should be associated with the signal or data to be reduced. Further security can be increased by including block ciphers, special one way functions, one time stamps or even biometric devices in the software or hardware devices that can be embodied. Passwords or biometric data are able to assist in the determination of the identity of the user or owner of the data, or some relevant identifying information.

A variety of keys may advantageously be chosen. Additionally, any key or keys employed need not remain static over time but may be changed from time to time. For instance, the key may be changed in real time, or upon detection of a "marker" signal within the data signal stream. The key can also be a ciphered key. As is known in the art, the key or keys may be generated by any of a variety of effective methods, including steganographic cipher, symmetric cryptographic cipher, and asymmetric cryptographic cipher. Keys may be derived (in whole or in part) from the signal stream itself or may be derived from sources completely external to the signal stream.

Additionally, and given that information signals may comprise a variety of forms of information (e.g., audio, still image, video, computer code, or text), it is appreciated that a single multimedia information signal stream may be divided into multiple substreams based on the various constituent information forms in the multimedia information stream. It could be advantageous, in such a substreamed context, to associate predetermined discrete, and particular, forms or instances of key or key pair to particular information substreams—for instance, a predetermined first key or key pair could be assigned for association and use with a video substream whereas a predetermined second key or key pair could be assigned for association and use with a text substream. Thus, complex watermarking of a multi-substream data signal may be flexibly accomplished. Such complexity may contribute, inter alia, to more effective watermarking and security as multiple watermarks would have to be compromised in order to compromise the entire aggregate information stream or set of substreams. Keys and key pairs are understood to be multifunctional, insofar as they are useful for both the encoding and decoding of watermarks.

An example of a real world application is helpful here. Given the predominant concern, at present, of MPEG 1 Layer 3, or MP3, a perceptual lossy compression audio data format, which has contributed to a dramatic re-evaluation of the distribution of music, a digital watermark system must be able to handle casual and more dedicated piracy in a consistent manner. The present invention contemplates compatibility with MP3, as well as any perceptual coding technique that is technically similar. One issue, is to enable a universal copy control "key" detect a watermark as quickly as possible from a huge range of perceptual quality measures. For instance, DVD 24 bit 96 kHz, encoded watermarks, should be detected in at least "real time," even after the signal has been down sampled, to say 12 kHz of the 96 kHz originally referenced. By delineating and starting with less data, since the data-reduced signal is obviously smaller though still related perceptually to the original DVD signal, dramatic increases in the speed and survival of the universal copy control bits can be achieved. The present invention also permits the ability to separate any other bits which may be associated with other more secure predetermined keys or key pairs.

Where the data stream is executable computer code, the present invention contemplates breaking the code into objects or similar units of functionality and allowing for determination of what is functionally important. This may be more apparent to the developer or users of the software or related hardware device. Data reduction through the use of a subset of the functional objects related to the overall functionality of the software or executable code in hardware or microchips, increase the copyright protection or security sought, based on reducing the overall data to be associated with predetermined keys or key pairs. Similarly, instead of mapping functions, transfer functions, so-called "scrambling," appear better candidates for this type of security although both mapping and transferring may be used in the same system. By layering the security, the associated keys and key pairs can be used to substantially improve the security and to offer easier methods for changing which functional "pieces" of executable computer code are associated with which predetermined keys. These keys may take the form of time-sensitive session keys, as with transactions or identification cards, or more sophisticated asymmetric public key pairs which may be changed periodically to ensure the security of the parties' private keys. These keys may also be associated with passwords or biometric applications to further increase the overall security of any potential implementation.

An example for text message exchange is less sophisticated but, if it is a time sensitive event, e.g., a secure communication between two persons, benefits may also be encountered here. Security may also be sought in military communications. The ability to associate the securely exchanged keys or key pairs while performing data reduction to enhance the detection or decoding performance, while not compromising the level of security, is important. Though a steganographic approach to security, the present invention more particularly addresses the ability to have data reduction to increase speed, security, and performance of a given steganographic system. Additionally, data reduction affords a more layered approach when associating individual keys or key pairs with individual watermark bits, or digital signature bits, which may not be possible without reduction because of considerations of time or the payload of what can be carried by the overall data "covertext" being transmitted.

Layering through data reduction offers many advantages to those who seek privacy and copyright protection. Serialization of the detection chips or software would allow for more secure and less "universal" keys, but the interests of the copyright owners are not always aligned with those of hardware or software providers. Similarly, privacy concerns limit the amount of watermarking that can be achieved for any given application. The addition of a pre-determined and cryptographic key-based "forensic" watermark, in software or hardware, allows for 3rd party authentication and provides protection against more sophisticated attacks on the copy control bits. Creating a "key pair" from the "predetermined" key is also possible.

Separation of the watermarks also relates to separate design goals. A copy control mechanism should ideally be inexpensive and easily implemented, for example, a form of "streamed watermark detection." Separating the watermark also may assist more consistent application in broadcast monitoring efforts which are time-sensitive and ideally optimized for quick detection of watermarks. In some methods, the structure of the key itself, in addition to the design of the "copy control" watermark, will allow for few false positive results when seeking to monitor radio, television, or other streamed broadcasts (including, for example, Internet) of copyrighted material. As well, inadvertent tampering with the embedded signal proposed by others in the field can be avoided more satisfactorily. Simply, a universal copy control watermark may be universal in consumer electronic and general computing software and hardware implementations, but less universal when the key structure is changed to assist in being able to log streaming, performance, or downloads, of copyrighted content. The embedded bits may actually be paired with keys in a decode device to assure accurate broadcast monitoring and tamper proofing, while not requiring a watermark to exceed the payload available in an inaudible embedding process. E.g., A full identification of the song, versus time-based digital signature bits, embedded into a broadcast signal, may not be recovered or may be easily over encoded without the use of block ciphers, special one way functions or one time pads, during the encoding process, prior to broadcast. Data reduction as herein disclosed makes this operation more efficient at higher speeds.

A forensic watermark is not time sensitive, is file-based, and does not require the same speed demands as a streamed or broadcast-based detection mechanism for copy control use. Indeed, a forensic watermark detection process may require additional tools to aid in ensuring that the signal to be analyzed is in appropriate scale or size, ensuring signal characteristics and heuristic methods help in appropriate recovery of the digital watermark. Simply, all aspects of the underlying content signal should be considered in the embedding process because the watermarking process must take into account all such aspects, including for example, any dimensional or size of the underlying content signal. The dimensions of the content signal may be saved with the key or key pair, without enabling reproduction of the unwatermarked signal. Heuristic methods may be used to ensure the signal is in proper dimensions for a thorough and accurate detection authentication and retrieval of the embedded watermark bits. Data reduction can assist in increasing operations of this nature as well, since the data reduction process may include information about the original signal, for example, signal characteristics, signal abstracts, differences between samples, signal patterns, and related work in restoring any given analog waveform.

The present invention provides benefits, not only because of the key-based approach to the watermarking, but the vast increase in performance and security afforded the implementations of the present invention over the performance of other systems.

The architecture of key and key-pair based watermarking is superior to statistical approaches for watermark detection because the first method meets an evidentiary level of quality and are mathematically provable. By incorporating a level of data reduction, key and key paired based watermarking is further improved. Such levels of security are plainly necessary if digital watermarks are expected to establish responsibility for copies of copyrighted works in evidentiary proceedings. More sophisticated measures of trust are necessary for use in areas which exceed the scope of copyright but are more factually based in legal proceedings. These areas may include text authentication or software protection (extending into the realm of securing microchip designs and compiled hardware as well) in the examples provided above and are not contemplated by any disclosure or work in the art.

The present invention may be implemented with a variety of cryptographic protocols to increase both confidence and security in the underlying system. A predetermined key is described as a set of masks: a plurality of mask sets. These masks may include primary, convolution and message delimiters but may extend into additional domains. In previous disclosures, the functionality of these masks is defined solely for mapping. Public and private keys may be used as key pairs to further increase the unlikeliness that a key may be compromised. Examples of public key cryptosystems may be found in the following U.S. Pat. Nos. 4,200,770; 4,218,582; 4,405,829; and 4,424,414, which examples are incorporated herein by reference. Prior to encoding, the masks described above are generated by a cryptographically secure random generation process. Mask sets may be limited only by the number of dimensions and amount of error correction or concealment sought, as has been previously disclosed.

A block cipher, such as DES, in combination with a sufficiently random seed value emulates a cryptographically secure random bit generator. These keys, or key pairs, will be saved along with information matching them to the sample stream in question in a database for use in subsequent detection or decode operation. These same cryptographic protocols may be combined with the embodiments of the present invention in administering streamed content that requires authorized keys to correctly display or play said streamed content in an unscrambled manner. As with digital watermarking, symmetric or asymmetric public key pairs may be used in a variety of implementations. Additionally, the need for certification authorities to maintain authentic key-pairs becomes a consideration for greater security beyond symmetric key implementations, where transmission security is a concern.

Signal Processing in a Multi-Watermark System (a Plurality of Streams May be Watermarked)

Figure 2:
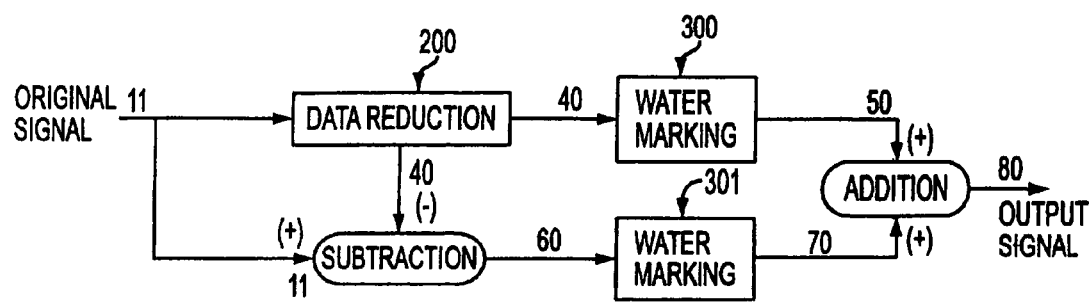
FIG. 2 is a functional block diagram for an embodiment of the present invention which illustrates the generation of an output signal comprised of a data-reduced, watermarked signal and a first remainder signal.

FIG. 2 illustrates a system and method of implementing a multiple-watermark system. An input signal 11 (e.g., binary executable code, instruction text. or other data), is first processed by a lossy data-reduction scheme 200 (e.g., downsampling, bit-rate reduction, or compression method) to produced a data-reduced signal 40. Data-reduced signal 40 is then embedded with a watermark (process step 300) to generate a watermarked, data-reduced signal 50, while a copy of the unmarked, data-reduced signal 40 is saved.

Watermarking process step 300 may be chosen from among various watermarking processes known in the art. As an example, a digital audio data signal may be represented, for purpose of watermarking, by a series of samples in 1 dimension. $\{S_1, S_2, S_3 \ldots S_n\}$. This series is also referred to as a sample stream. The sample stream approximates an analog waveform of sound amplitude over time. Each sample represents an estimate of the wave amplitude at the instant of time the sample is recorded. For monaural audio, there is one such sample stream. Stereo audio is comprised of two sample streams, one representing the right channel, and the other representing the left. Each stream is used to drive a corresponding speaker to reproduce the stereo sound. What is referred to as CD quality audio is characterized by 16 bit (2 byte) stereo samples, recorded at 44.1 Khz, or 44,100 samples per second in each channel. The dynamic range of sound reproduction is directly proportional to the number of bits per sample. Some lower quality recordings are done at 8 bits. A CD audio recording can be stored using any scheme for containing the 2 sample streams in their entirety. When these streams are played back at the same frequency they were recorded at, the sound recorded is reproduced to a high degree of accuracy. The sample stream is processed in order from first sample to last. For the purpose of the invention disclosed, the stream is separated into sample windows, each of which has a fixed number of consecutive samples from the stream, and where windows do not overlap in the sample stream. Windows may be contiguous in the sample stream. For illustration, assume each window contains 128 samples, and that windows are contiguous. Thus, the windows within the stream look like $\{>S_1, S_2, S_3 \ldots S_{128}!, >S_{129}, S_{130}, S_{131} \ldots S_{256}! \ldots > S_{n-128} \ldots S_n!\}$ wherein the bracketed set $> \ldots !$ denotes each window and any odd samples at the end of the stream which do not completely fill a window can be ignored, and simply passed through the system unmodified.

These windows will be used as input for the discrete Fast Fourier Transform (and its inverse) operation. Briefly, Fourier Transform methods are based on the principle that a complex waveform, expressed as amplitude over time and represented by a sample stream, is really the sum of a number of simple waveforms, each of which oscillates at different frequencies. By complex, it is meant that the value of the next sample is not easily predicted from the values of the last N samples or the time of the sample. By simple it is meant that the value of the sample is easily predictable from the values of the last N samples and/or the time of the sample.

The sum of multiple simple waves is equivalent to the complex wave. The discrete FFT and its inverse simply translate a limited amount of data from one side of this equivalence to the other, between the complex waveform and the sum of simple waves. The discrete FFT can be used to translate a series of samples representing amplitude over time (the complex wave, representing a digital audio recording) into the same number of samples representing total spectral energy in a given range of frequencies (the simple wave components) at a particular instant of time. This instant is the time in the middle of the original amplitude/time samples. The inverse discrete FFT translates the data in the other direction, producing the complex waveform, from its simpler parts.

Each 128 sample window will be used as an input to the discrete FFT, resulting in 128 bins representing each of 128 frequency bands, ranging from 0 Hz to 22 Khz (the Nyquist frequency, or ½ the sampling rate).

Information can be encoded into the audio signal in the frequency domain or in the time domain. In the latter case, no FFT or inverse FFT is necessary. However, encoding in the frequency domain is recommended, since its effects are scattered over the resultant time domain samples, and not easily predicted. In addition, frequency domain encoding makes it more likely that randomization will result in noticeable artifacts in the resultant signal, and therefore makes the stegacipher more defensible against such attacks. It is in the frequency domain that additional information will be encoded into the audio signal for the purpose of this discussion. Each frequency band in a given time slice can potentially be used to store a small portion of some additional information to be added to the signal. Since these are discrete estimates, there is some room for error which will not significantly effect the perceived quality of the signal, reproduced after modification, by the inverse FFT operation. In effect, intentional changes, which cannot be distinguished from random variations, are introduced in the frequency domain, for the purpose of storing additional information in the sample stream. These changes are minimized so as not to adversely affect the perceived quality of the reproduced audio signal, after it has been encoded with additional information in the manner described below. In addition, the location of each of these changes is made virtually impossible to predict, an innovation which distinguishes this scheme from simple steganographic techniques.

The saved, unwatermarked data-reduced signal (signal 40) is subtracted from the original input signal 11, yielding a remainder signal 60 composed only of the data that was lost during the data-reduction. A second watermark is then applied using a desired watermarking protocol (process step 301) to remainder signal 60 to generate a watermarked remainder signal 70. Finally, the watermarked remainder 70 and the watermarked, data-reduced signal 50 are added to form an output signal 80, which is the final, full-bandwidth, output signal.

The two watermarking techniques (process steps 300 and 301) may be identical (i.e., be functionally the same), or they may be different.

To decode the signal, a specific watermark is targeted. Duplicating the data-reduction processes that created the watermark in some cases can be used to recover the signal that was watermarked. Depending upon the data-reduction method, it may or may not be necessary to duplicate the data-reduction process in order to read a watermark embedded in a remainder signal. Because of the data-reduction, the decoding search can occur much faster than it would in a full-bandwidth signal. Detection speed of the remainder watermark remains the same as if there were no other watermark present.

Figure 4:
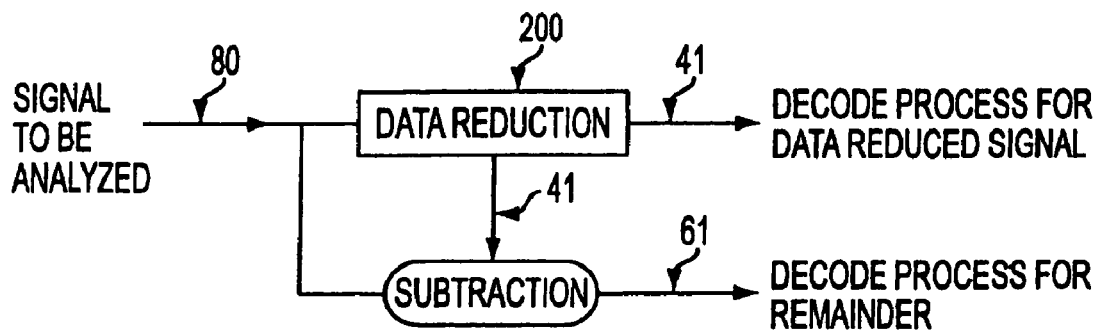
FIG. 4 is a functional block diagram for decoding the output signal generated by the system illustrated in FIG. 2.

FIG. 4 illustrates a functional block diagram for one means of decoding the output signal generated by the system illustrated in FIG. 2. A signal to be analyzed 80 (e.g., the same output from FIG. 2) is processed by a data-reduction scheme 200. Data reduced signal 41 can then be decoded to remove the message that was watermarked in the original data reduced signal. Further, data reduced signal 41 can be subtracted from signal to be analyzed 80 to form a differential signal 61 which can then be decoded to remove the message that was watermarked in the original remainder signal. A decoder may only be able to perform one of the two decodings. Differential access and/or different keys may be necessary for each decoding.

Additionally, the watermarking described in connection with this embodiment above may be done with a plurality of predetermined keys or key pairs associated with a single watermark "message bit," code object, or text. Keys or key pairs may also be stored or archived in a central certification authority, such that there will be a verified and official version of a particular key or key pair whenever access to such key or key pair, or verification or identification of the legitimacy and authorization of the use of a particular data signal or file associated with that key, is required. The central certification authority could be, for instance, a secure computer server archive maintained by a copyright holder to store keys relating to copyrighted files watermarked using such keys.

Signal Processing in a Single Watermark System

Figure 3:
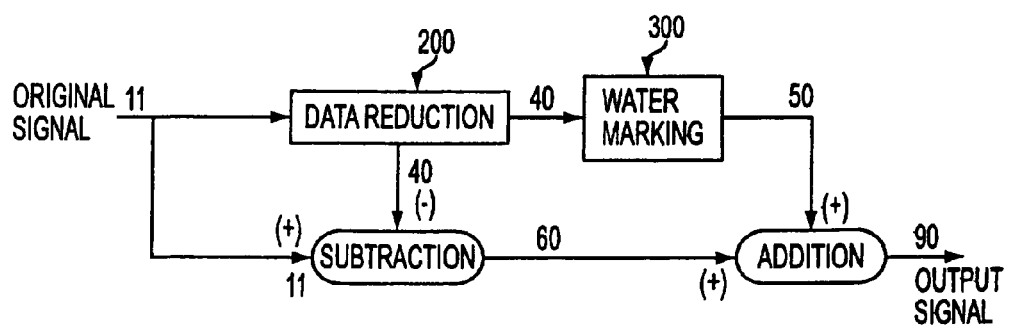
FIG. 3 is a functional block diagram for an embodiment of the present invention which illustrates the generation of an output signal comprised of a data-reduced, watermarked signal and a watermarked, first remainder signal.

FIG. 3 illustrates a system and method of implementing a single watermark system. The process and system contemplated here is identical to process described in connection to FIG. 2, above, except that no watermark is embedded in the remainder signal. Hence, the watermarked, data-reduced signal 50 is added directly to the remainder signal 60 to generate an output signal 90.

Additionally, the watermarking described in connection with this embodiment above may be done with a plurality of predetermined keys or key pairs associated with a single watermark "message bit," code object, or text.

In either process, an external key can be used to control the insertion location of either watermark. In a copy-control system, a key is not generally used, whereas in a forensic system, a key must be used. The key can also control the parameters of the data-reduction scheme. The dual scheme can allow a combination of copy-control and forensic watermarks in the same signal. A significant feature is that the copy-control watermark can be read and rewritten without affecting the forensic mark or compromising its security.

Figure 5:
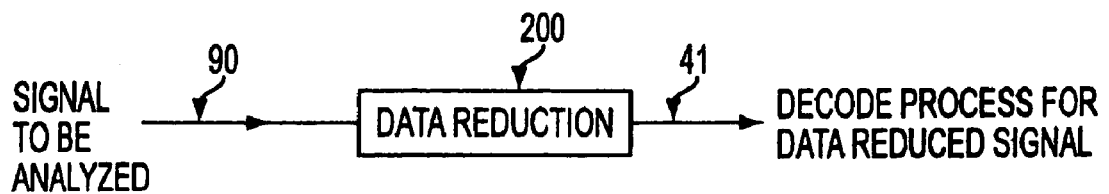
FIG. 5 is a functional block diagram for decoding the output signal generated by the system illustrated in FIG. 3.

FIG. 5 illustrates a functional block diagram for one means of decoding the output signal generated by the system illustrated in FIG. 3. A signal to be analyzed 90 (e.g., the same output from FIG. 3) is processed by a data-reduction scheme 200. Data reduced signal 41 can then be decoded to remove the message that was watermarked in the original data reduced signal.

Signal Processing in a Multi-Scrambler System (a Plurality of Streams May be Scrambled)

Figure 6:
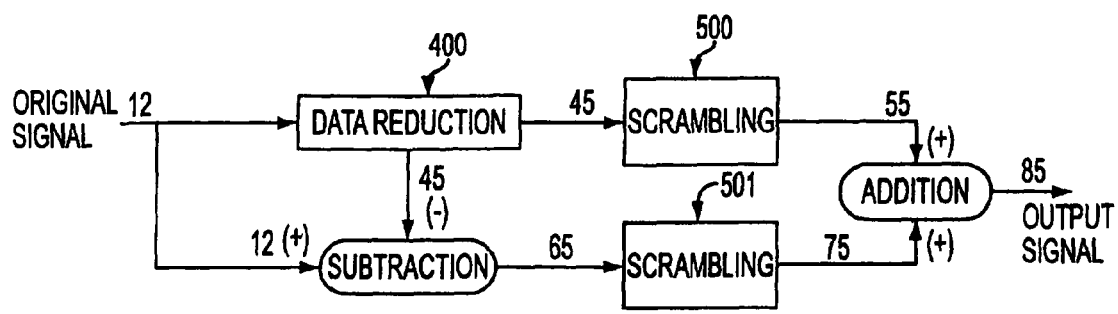
FIG. 6 is a functional block diagram for an embodiment of the present invention which illustrates the generation of an output signal comprised of a data-reduced, scrambled signal and a first remainder signal.

FIG. 6 illustrates a system and method of implementing a multi-scrambler system. An input signal 12 (e.g., binary executable code, instruction text. or other data), is first processed by a lossy data-reduction scheme 400 (e.g., down-sampling, bit-rate reduction, or compression method) to produced a data-reduced signal 45. Data-reduced signal 45 is then scrambled using a first scrambling technique (process step 500) to generate a scrambled, data-reduced signal 55, while a copy of the unscrambled, data-reduced signal 45 is saved.

The saved, unscrambled data-reduced signal (signal 45) is subtracted from the original input signal 12, yielding a remainder signal 65 composed only of the data that was lost during the data-reduction. A second scrambling technique is then applied (process step 501) to remainder signal 65 to generate a scrambled remainder signal 75. Finally, the scrambled remainder signal 75 and the scrambled data-reduced signal 55 are added to form an output signal 85, which is the final, full-bandwidth, output signal.

The two scrambling techniques (process steps 500 and 501) may be identical (i.e., be functionally the same), or they may be different.

Additionally the scrambling described in connection with this embodiment may be done with a plurality of predetermined keys or key pairs associated with a single scrambling operation containing only a "message bit," code object, or text.

To decode the signal, unscrambling follows the exact pattern of the scrambling process except that the inverse of the scrambling transfer function is applied to each portion of the data, thus returning it to its pre-scrambled state.

Figure 8:
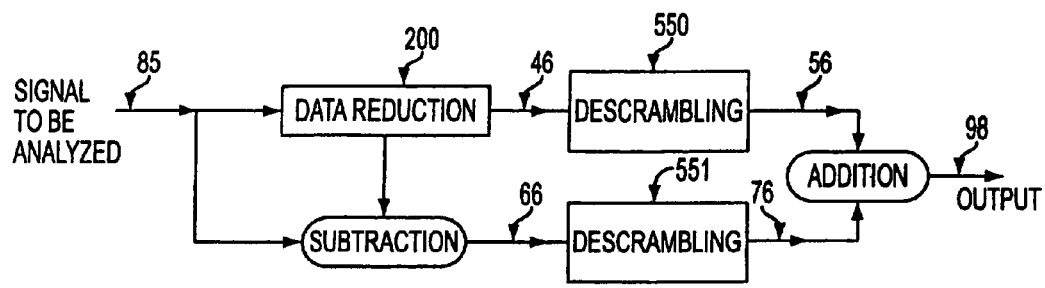
FIG. 8 is a functional block diagram for decoding the output signal generated by the system illustrated in FIG. 6.

FIG. 8 illustrates a functional block diagram for one means of decoding the output signal generated by the system illustrated in FIG. 6. A signal to be analyzed 85 (e.g., the same output from FIG. 6) is processed by a data-reduction scheme 200. Data reduced signal 46 can be subtracted from signal to be analyzed 85 to form a differential signal 66, which signal can then be descrambled in process 551 using the inverse transfer function of the process that scrambled the original remainder signal (e.g., the inverse of scrambling process 501). Descrambling process 551 generates an descrambled signal 76. Data reduced signal 46 may further be descrambled in process 550 using the inverse transfer function of the process that scrambled the original data reduced signal (e.g., the inverse of scrambling process 500). Descrambling process 550 generates an descrambled signal 56, which may then be added to descrambled signal 76 to form an output signal 98.

Signal Processing in a Single Scrambling Operation

Figure 7:
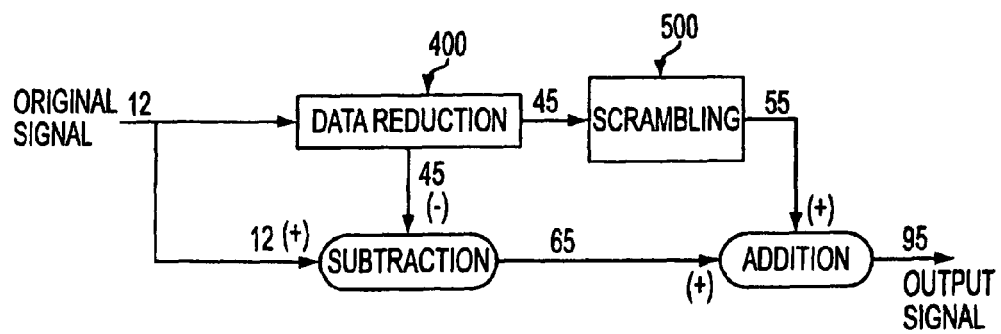
FIG. 7 is a functional block diagram for an embodiment of the present invention which illustrates the generation of an output signal comprised of a data-reduced, scrambled signal and a scrambled, first remainder signal.

FIG. 7 illustrates a system and method of implementing a single scrambling system. The process and system contemplated here is identical to process described in connection to FIG. 6, above, except that no scrambling is applied to the remainder signal. Hence, the scrambled data-reduced signal 55 is added directly to the remainder signal 65 to generate an output signal 95.

Additionally the scrambling described in connection with this embodiment may be done with a plurality of predetermined keys or key pairs associated with a single scrambling operation containing only a "message bit," code object, or text.

Figure 9:
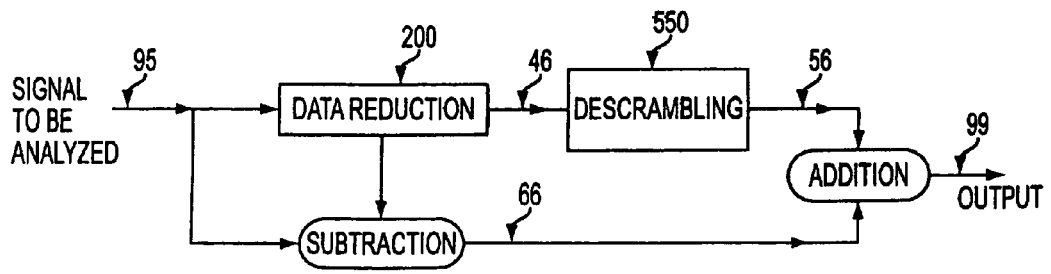
FIG. 9 is a functional block diagram for decoding the output signal generated by the system illustrated in FIG. 7.

FIG. 9 illustrates a functional block diagram for one means of decoding the output signal generated by the system illustrated in FIG. 7. A signal to be analyzed 95 (e.g., the same output from FIG. 7) is processed by a data-reduction scheme 200. Data reduced signal 46 can be subtracted from signal to be analyzed 95 to form a differential signal 66. Data reduced signal 46 may further be descrambled in process 550 using the inverse transfer function of the process that scrambled the original data reduced signal (e.g., the inverse of scrambling process 500). Descrambling process 550 generates an descrambled signal 56, which may then be added to differential signal 66 to form an output signal 99.

Sample Embodiment

Combinations

Another embodiment may combine both watermarking and scrambling with data reduction. Speed, performance and computing power may influence the selection of which techniques are to be used. Decisions between data reduction schemes ultimately must be measured against the types of keys or key pairs to use, the way any pseudo random or random number generation is done (chaotic, quantum or other means), and the amount of scrambling or watermarking that is necessary given the needs of the system. It is quite possible that some derived systems would yield a fairly large decision tree, but the present invention offers many benefits to applications in security that are not disclosed in the art.

As a further illustrative example of an advantageous embodiment, the following briefly describes an implementation of the present invention using sample rate reduction as the chosen data reduction method for watermarking in connection with an audio data signal.

I. Encoding:
   Audio data is downsampled from the original sample rate to 10 kHz.
   The 10 kHz signal is upsampled to the original sample rate, yielding the 10 kHz upsample.
   The 10 kHz upsample is subtracted from the original, yielding the 10 kHz upsample difference.
   The 10 kHz signal is downsampled to 5 kHz.
   The 5 kHz signal is upsampled to the 10 kHz, yielding the 5 kHz upsample.
   The 5 kHz upsample is subtracted from the 10 kHz signal, yielding the 5 kHz upsample difference.
   The 5 kHz signal is marked with an open watermark (universal key for universal access), yielding the 5 kHz watermark.
   The 5 kHz upsample difference is marked with a secure watermark (one key per encode), yielding the 10 kHz watermark.
   The 5 kHz watermark is upsampled to 10 kHz, yielding the 5 kHz upsampled watermark.
   The 5 kHz upsampled watermark is summed with the 10 kHz watermark, to yield the 10 kHz watermark sum.
   The 10 kHz watermark sum is upsampled to the original sample rate, yielding the 10 kHz upsampled watermark.
   The 10 kHz upsampled watermark is summed with the 10 kHz upsample difference to produce the output signal.

II(A). Decoding Both Watermarks, or Just the Secure Watermark:
   Audio data is downsampled from the original sample rate to 10 kHz.
   The 10 kHz signal is downsampled to 5 kHz.
   The 5 kHz signal is upsampled to the 10 kHz, yielding the 5 kHz upsample.
   The 5 kHz upsample is subtracted from the 10 kHz signal, yielding the 5 kHz upsample difference.
   The open watermark is decoded from the 5 kHz.
   The secure watermark is decoded from the 5 kHz upsample.

IIB. Decoding Just the Open Watermark:
   Audio data is downsampled from the original sample rate to 5 kHz.
   The open watermark is decoded from the 5 kHz.

In connection with the above-described embodiment, alternative step IIB is illustrated because decoding the open watermark may have to occur on consumer electronic devices, and therefore, generally, fewer processing steps may be desirable in consumer electronic devices. The secure watermark is not as time-critical during the decode process, and can therefore be afforded more processing time. Note further that the original sample rate during the encode does not have to be the same as the original sample rate for decode. Any intervening sample rate conversion will be ignored, as long as it never drops below the same rate of the signal to which the watermark is applied (for example, 10 kHz for the secured watermark of the prior example, or 5 kHz for the open watermark of the prior example).

The embodiments described herein may advantageously be implemented in connection with a data signal recipient's personal computer system or workstation (comprising a computer processor such as an Intel Pentium processor, spreadsheet software such as Microsoft Excel, and implementing a communications module such as a common web browser such as Internet Explorer or Netscape), linked by a World Wide Web connection to a data signal or file provider utilizing similar standard computer hardware and software, but may also be implemented in connection with any output device having appropriate electronic memory and/or processing capacity to implement the techniques set forth herein (which could include, for instance, consumer electronics output devices other than microcomputers). Because the digital watermarking techniques and systems disclosed herein are substantially universal, however, they may be applied across a variety of computer hardware and software configurations, for use with a variety of transmitted data signals or files, over a variety of public or private networks (although the utility of the present invention for digital watermarking of audio or video files transmitted over public networks such as the interne is obvious). The network communication link between the data signal/file recipient and the signal/file provider may further be provided with some network-default level of encryption (perhaps a relatively weak level such as 56 bit encryption). Similarly, known computer programming techniques and languages (for instance, Visual Basic, JAVA, C++) may be adapted in a variety of fashions for use in either the data reduction steps discussed herein, the cryptographic/scrambling processes disclosed, the specific watermarking techniques applied, or any combination of the above, for customized data reduction and digital watermarking, and output of an output signal, in the fashion most amenable to a particular user's needs. The ability to adapt a wide range of data processing algorithms (including but not limited to algorithms for data reduction, encryption/decryption, and compression) to yield various desired data signal outputs, to apply customizable digital watermarking procedures, and to allow customizable and maximally-efficient forensic or copy control watermarks to popular and useful data transmission protocols, all across a broad range of computer system platforms (i.e., various hardware, software, computer language, and operating system combinations) provides the present invention with considerable versatility.

The present invention as implemented with such computer systems permits secured delivery of valuable data streams over a variety of networks. Specifically, the present invention provides great utility for the delivery (commercial or otherwise) of video, audio, or other such files on media or over a public network such as the internet in a fashion that impedes theft or unauthorized use or resale of such files. For instance, the methods of the present invention could be applied to all the digitized commercial music files of a music vendor (to impose, for instance, a copy control watermark thereupon). Subsequently, those watermarked music files may be delivered to end users. End user attempts to make unauthorized copies can thus be controlled. Alternatively, output devices may be programmed to detect watermarks embedded in files by use of the present invention, such that if the file does not contain an appropriate watermark, the output device will not execute or "play" the file.

It is important to note that the watermarks embedded using the present invention may be embedded at a wide variety of points along the distribution chain for the data signals. For instance, in an embodiment in which the present invention is used to watermark commercial music or video files downloaded by an individual end user from a central server over an internet connection through an internet service provider, the present invention could be used to impose a forensic watermark (uniquely identifying the customer and download transaction) at the central server (or at the server of the internet service provider). When a suspected unauthorized copy of the file in question was detected, the watermark therein could be sensed/decoded in order to identify the source of the unauthorized copy. As has been emphasized, the techniques of the present invention may be applied to a wide variety of data signals, whether stored multimedia or computer code files, streamed files transmitted in real time, or other files or data signals, and may be applied in context-sensitive fashion to maximize protection (and effective signal transmission and output) for a particular data stream. It is also an aspect of this invention that the novel techniques for watermarking using data reduction herein can be exploited at the end user point of the distribution chain for data signals; that is, using the unique watermark/key information associated with a file watermarked using the techniques described hereinabove, a file may be analyzed (whether by representatives of a file copyright owner, for instance, or by hardware, software, or other appropriate analyzer, such as an embedded firmware chip, etc. contained in or supplied to an end user output device). Once the data signal is analyzed at the end user point, information relative to the any watermark or key actually contained on the file at that point may be derived and analyzed to determine if the file has been properly distributed to the end user. If it has not, the output device may be programmed to deny output or to manipulate the data signal in a destructive way (or to take other appropriate legal or copyright control action as may be desired by the file owner). The present invention includes such uses of (and devices for) data reduction-derived watermark detection and output control.

Those of ordinary skill in the art will appreciate that the foregoing discussion of certain preferred embodiments is illustrative only, and does not limit the spirit and scope of the present invention, which are limited only by the claims set forth below.

What is claimed is:

1. A system for securing a data signal comprising: a first processor coupled to a memory to apply a data reduction technique to reduce the data signal into a reduced data signal; a subtractor to subtract said reduced data signal from the data signal to produce a remainder signal; a second processor to apply a first cryptographic technique to encrypt the reduced data signal to produce an encrypted, reduced data signal; a third processor to apply a second cryptographic technique to encrypt the remainder signal to produce an encrypted remainder signal; and an adder to add said encrypted, reduced data signal to said encrypted remainder signal to produce an output signal.

2. The system of claim 1, wherein the first, second and third processors are comprised of one, two or three separate processors.

3. The system of claim 1, wherein the memory contains a copy of the data signal and the subtractor to subtract the reduced data signal to produce a remainder signal uses the memory copy of the data signal for the subtraction.

4. The system of claim 1, wherein at least one of said second and third processors to apply a first and second cryptographic technique utilizes a watermarking technique for encoding a digital watermark in a signal.

5. The system of claim 1, wherein at least one of said second and third processors to apply a first and second cryptographic technique utilizes a scrambling technique.

6. The system of claim 1, wherein the data reduction technique comprises a data compression technique.

7. The system of claim 6, wherein the data compression technique comprises selective sampling of the data signal in a domain selected from the group comprising the time domain, bit depth domain, and the frequency domain.

8. The system of claim 1 wherein said system is configured to use said first processor to apply said data reduction technique, said system is configured to use said subtractor to subtract said reduced data signal from said data signal, said system is configured to use said third processor to apply said cryptographic technique, and said system is configured to use said adder to add said encrypted, reduced data signal to said encrypted remainder signal.

9. A system for securing a data signal comprising the steps of: an analyzer for evaluating the data signal to determine its characteristics and reducibility; a selector for selecting at least one appropriate data reduction technique for the data signal; a processor coupled to a memory to apply said at least one appropriate data reduction technique; an encoder for encoding at least one digital watermark in the data signal or data reduced signal; and an output for supplying an output signal corresponding to the data signal.

10. The system of claim 9, wherein the analyzer analytically splits the data signal into a plurality of discrete data substreams; and wherein the processor applies the appropriate data reduction technique selected for at least one of the plurality of data substreams.

11. The system of claim 10, wherein the appropriateness of said at least one data reduction technique is determined by the selector with reference to data signal or data substream characteristics selected from at least one of: (a) desired output quality for said output signal; (b) desired data reduction ratio; (c) audio character of data; (d) video character of data; (e) text character of data; (f) executable software character of data.

12. The system of claim 10, wherein a different appropriate data reduction technique is chosen by the selector for each of the plurality of data substreams.

13. The system of claim 10, further comprising the steps of performing upon at least one of said data substreams by the processor: (a) a scrambling technique; (b) an encryption technique.

14. The system of claim 13, wherein at least one of said steps of watermarking, scrambling, or encrypting by the processor comprises applying at least one cryptographic key.

15. The system of claim 14, wherein said at least one cryptographic key is derived at least in part from the data signal.

16. The system of claim 14, wherein said at least one cryptographic key is not derived from the data signal.

17. The system of claim 9, wherein the appropriateness of the at least one data reduction technique is determined by the selector with reference to data signal characteristics selected from at least one of: (a) desired output quality for said output signal; (b) desired data reduction ratio; (c) audio character of data; (d) video character of data; (e) text character of data; (f) executable software character of data.

18. A system for protected distribution of a data file comprising: (a) an encoder for encoding one or more digital watermarks in the data file using data reduction techniques in creating said digital watermark, wherein the use of data reduction techniques comprises creation of a reduced portion of the data file and a remainder portion of the data file; (b) and a transmission device for distributing the digitally watermarked file to an end user.

19. The system of claim 18, wherein both the reduced portion and the remainder portion of the data file are embedded by the encoder with said one or more digital watermarks.

20. The system of claim 19, wherein said watermarked, reduced portion is recombined with said watermarked, remainder portion of said data file by an adder to produce an output signal.

21. The system of claim 18, wherein said step of encoding said one or more digital watermarks in the data file with the encoder is performed on a central computer server and said watermarked data file is subsequently transmitted to an end user output device.

22. The system of claim 21, wherein said step of distributing with a transmission device comprises distributing over a public data network.

23. The system of claim 22, wherein said public data network comprises the internet.

24. The system of claim 18, wherein said system of further configured to supply the end user with a detector for detecting information about said digital watermark.

25. The system of claim 18, wherein said data file comprises a file selected from the group containing music files, audio files, video files, still image files, streaming media files, and executable computer software files.

26. The system of claim 18, wherein at least one of said digital watermarks created using data reduction comprises a universal copy control watermark for prevention of unauthorized data file copying.

27. The system of claim 18, wherein at least one of said digital watermarks created using data reduction comprises a forensic watermark for tracing of historical data regarding the distribution history of the data file.

28. The system of claim 18 wherein said system is configures to use said encoder to encode said one or more digital watermarks in the data file using data reduction techniques, and said system is configured to use said transmission device for distributing the digitally watermarked file.

29. A system for securing a data signal comprising:
memory;
at least one processor coupled to a said memory, and said system configured to use said at least one processor to apply a data reduction technique to reduce the data signal into a reduced data signal;
at least one subtractor, and said system configured to use said at least one subtractor to subtract said reduced data signal from the data signal to produce a remainder signal;
said system configured to use said at least one processor to apply a first cryptographic technique to encrypt the reduced data signal to produce an encrypted, reduced data signal;
said system configured to use said at least one processor to apply a second cryptographic technique to encrypt the remainder signal to produce an encrypted remainder signal; and
at least one adder, said system configured to use said at least one adder to add said encrypted, reduced data signal to said encrypted remainder signal to produce an output signal.

30. The system of claim 29, wherein the memory stores a copy of the data signal and said at least one subtractor is configured to retrieve said copy of said data signal stored in said memory.

31. A system for protected distribution of a data signal comprising:
(a) at least one encoder for encoding one or more digital watermarks in the data signal using data reduction techniques in creating said digital watermark, and said system configured to use said at least one encoder to encode said one or more digital watermarks in the data signal using data reduction techniques, wherein the use of data reduction techniques comprises creation of a reduced portion of the data signal and a remainder portion of the data signal; and
(b) at least one transmission device for distributing the digitally watermarked signal to an end user, and said system configured to use said at least one transmission device to distribute said digitally watermarked signal.

32. The system of claim 31, wherein said system is configured to use said at least one encoder to embed both the reduced portion and the remainder portion of the data signal with said one or more digital watermarks.

33. The system of claim 31, wherein said system further comprises at lest one adder, and said system is configured to use said at least one adder to recombine said watermarked, reduced portion with said watermarked, remainder portion of said data signal.

34. A system for securing a data signal comprising:
memory;
at least one processor coupled to a said memory, and said system configured to use said at least one processor to apply a data reduction technique to the data signal to create a reduced portion of the data signal and a remainder portion of the data signal;
at least one encoder for encoding one or more digital watermarks in the reduced portion of the data signal thereby creating a digital watermarked reduced portion of the data signal;
at least one adder or subtractor, and said system configured to use said at least one adder or subtractor to add or subtract said digitally watermarked reduced portion of the data signal to the data signal to thereby produce a secure version of said data signal.

* * * * *

UNITED STATES PATENT AND TRADEMARK OFFICE
CERTIFICATE OF CORRECTION

PATENT NO. : 8,160,249 B2  
APPLICATION NO. : 12/655036  
DATED : April 17, 2012  
INVENTOR(S) : Moskowitz et al.

Page 1 of 1

It is certified that error appears in the above-identified patent and that said Letters Patent is hereby corrected as shown below:

Title Page Item (54) and Column 1 lines 1-3 change "UTILIZING DATA REDUCTION IN STEGANOGRAPHIC AND CRYPTOGRAPHIC SYSTEM" to -- UTILIZING DATA REDUCTION IN STEGANOGRAPHIC AND CRYPTOGRAPHIC SYSTEMS --.

Column 20 lines 25-26 change "domain selected from the group comprising the time domain, bit depth domain, and the frequency domain." to -- domain selected from a group comprising a time domain, bit depth domain, and a frequency domain. --.

Column 21 line 31 change "24. The system of claim 18, wherein said system of further" to -- 24. The system of claim 18, wherein said system is further --.

Column 21 line 43 change "forensic watermark for tracing of historical data regarding the" to -- forensic watermark for tracing of historical data regarding a --.

Column 21 line 52 change "at least one processor coupled to a said memory, and said" to -- at least one processor coupled to said memory, and said --.

Column 22 line 42 change "at least one processor coupled to a said memory, and said" to -- at least one processor coupled to said memory, and said --.

Signed and Sealed this  
Fourth Day of September, 2012

David J. Kappos  
*Director of the United States Patent and Trademark Office*